United States Patent
Ota et al.

(10) Patent No.: US 10,968,859 B2
(45) Date of Patent: Apr. 6, 2021

(54) PREMIXED COMPRESSION IGNITION ENGINE AND METHOD FOR CONTROLLING PREMIXED COMPRESSION IGNITION ENGINE

(71) Applicant: Mazda Motor Corporation, Hiroshima (JP)

(72) Inventors: Noriyuki Ota, Yokohama (JP); Ryohei Ono, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 27 days.

(21) Appl. No.: 16/464,667

(22) PCT Filed: Nov. 22, 2017

(86) PCT No.: PCT/JP2017/042068
§ 371 (c)(1),
(2) Date: May 28, 2019

(87) PCT Pub. No.: WO2018/101149
PCT Pub. Date: Jun. 7, 2018

(65) Prior Publication Data
US 2019/0345890 A1 Nov. 14, 2019

(30) Foreign Application Priority Data
Nov. 29, 2016 (JP) .............................. JP2016-231147

(51) Int. Cl.
*F02D 43/00* (2006.01)
*F02B 11/00* (2006.01)
(Continued)

(52) U.S. Cl.
CPC .............. *F02D 43/00* (2013.01); *F02B 11/00* (2013.01); *F02B 23/02* (2013.01); *F02B 47/02* (2013.01);
(Continued)

(58) Field of Classification Search
CPC ...... F02D 43/00; F02D 37/02; F02D 41/3041; F02D 41/3047; F02D 41/402; F02B 11/00;
(Continued)

(56) References Cited

U.S. PATENT DOCUMENTS

2009/0070010 A1* 3/2009 Miyashita ............. F02D 41/307
701/103
2016/0356228 A1* 12/2016 Liu ........................ F02D 41/402
(Continued)

FOREIGN PATENT DOCUMENTS

EP          3418540 A1    12/2018
JP       2002188447 A     7/2002
(Continued)

OTHER PUBLICATIONS

European Patent Office, Extended European Search Report Issued in Application No. 17876041.9, dated Oct. 22, 2019, 9 pages.
(Continued)

*Primary Examiner* — Joseph J Dallo
*Assistant Examiner* — Yi-Kai Wang
(74) *Attorney, Agent, or Firm* — Alleman Hall Creasman & Tuttle LLP

(57) ABSTRACT

Control is performed so as to occur SPCCI combustion in which, after an air-fuel mixture in a first area of a combustion chamber that includes an electrode portion of an ignition device is burned by receiving ignition energy, an air-fuel mixture formed in a second area located on an outer periphery of the first area is self-ignited. Control is also performed such that, in a high load operation region of an SPCCI combustion execution region, an air-fuel ratio in the entire combustion chamber becomes richer than a stoichiometric air-fuel ratio and that an air-fuel ratio of the air-fuel mixture (Continued)

in the first area becomes leaner than an air-fuel ratio of the air-fuel mixture in the second area.

7 Claims, 11 Drawing Sheets

(51) Int. Cl.

| | |
|---|---|
| *F02B 23/02* | (2006.01) |
| *F02B 47/02* | (2006.01) |
| *F02B 75/02* | (2006.01) |
| *F02B 75/20* | (2006.01) |
| *F02D 37/02* | (2006.01) |
| *F02D 41/30* | (2006.01) |
| *F02D 41/40* | (2006.01) |
| *F02M 25/03* | (2006.01) |
| *F02B 75/18* | (2006.01) |

(52) U.S. Cl.
CPC ............ *F02B 75/02* (2013.01); *F02B 75/20* (2013.01); *F02D 37/02* (2013.01); *F02D 41/3041* (2013.01); *F02D 41/3047* (2013.01); *F02D 41/402* (2013.01); *F02M 25/03* (2013.01); *F02B 2075/027* (2013.01); *F02B 2075/1816* (2013.01)

(58) Field of Classification Search
CPC .......... F02B 23/02; F02B 47/02; F02B 75/02; F02B 75/20; F02B 2075/027; F02B 2075/1816; F02M 25/03
USPC ...................................................... 123/25 C
See application file for complete search history.

(56) References Cited

U.S. PATENT DOCUMENTS

| | | | |
|---|---|---|---|
| 2017/0113690 A1* | 4/2017 | Kim | F02D 41/1475 |
| 2017/0234249 A1* | 8/2017 | Sakai | F02D 35/028 |
| | | | 123/295 |
| 2018/0038319 A1* | 2/2018 | Hakeem | F02D 35/023 |

FOREIGN PATENT DOCUMENTS

| | | |
|---|---|---|
| JP | 2003049650 A | 2/2003 |
| JP | 2012241590 A | 12/2012 |
| JP | 2012241591 A | 12/2012 |
| JP | 2013185542 A | 9/2013 |
| JP | 2015098800 A | 5/2015 |

OTHER PUBLICATIONS

Wang, X et al., "Effect of piston shapes and fuel injection strategies on stoichiometric stratified flame ignition (SFI) hybrid combustion in a PFI/DI gasoline engine by numerical simulations," Journal of Energy Conversion and Management, Apr. 17, 2015, 14 pages.

* cited by examiner

FIG. 10
(1) FIRST FUEL INJECTION
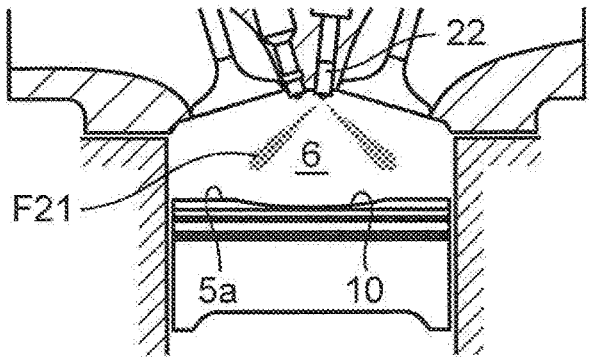
(2) FORM LEAN AIR-FUEL MIXTURE IN ENTIRE COMBUSTION CHAMBER
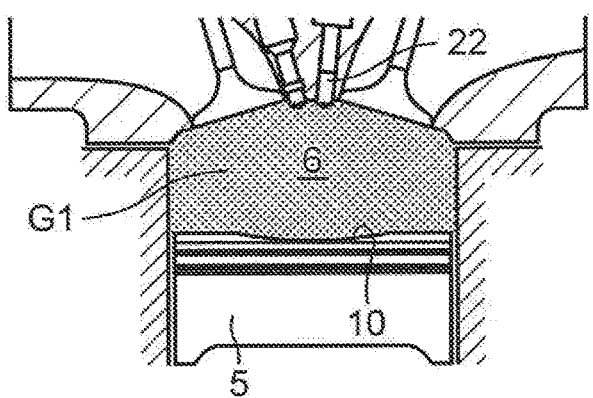
(3) SECOND FUEL INJECTION
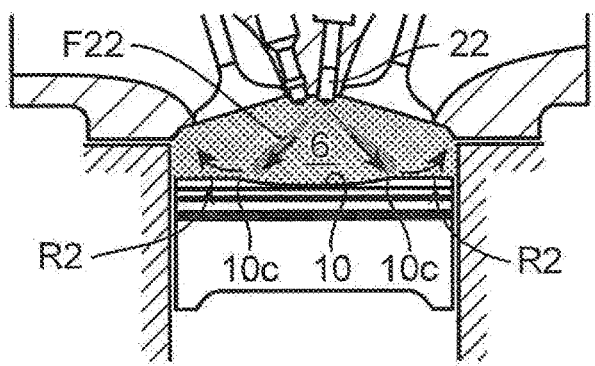
(4) FORM RICH AIR-FUEL MIXTURE IN OUTER PERIPHERAL AREA
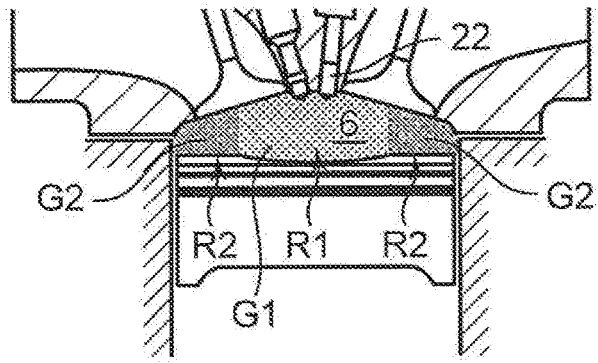

PREMIXED COMPRESSION IGNITION ENGINE AND METHOD FOR CONTROLLING PREMIXED COMPRESSION IGNITION ENGINE

TECHNICAL FIELD

The present invention relates to a premixed compression ignition engine which includes an engine body having a cylinder formed with a combustion chamber and self-ignites a mixture of fuel and air in the combustion chamber and to a method for controlling the premixed compression ignition engine.

BACKGROUND ART

Conventionally, in a gasoline engine or the like, it has been studied to perform so-called premixed compression ignition combustion in which a mixture of fuel and air mixed in advance is self-ignited in a combustion chamber.

In the premixed compression ignition combustion, it is possible to increase thermal efficiency as a compression ratio can be increased or the like. On the other hand, in the premixed compression ignition combustion, the air-fuel mixture starts combustion simultaneously at various places in the combustion chamber, so that a pressure in the combustion chamber, that is, an in-cylinder pressure rises abruptly, and consequently combustion noise tends to deteriorate. Further, in the premixed compression ignition combustion, a start timing of combustion, that is, a combustion start timing is liable to change depending on a temperature inside the combustion chamber or the like, and it is difficult to appropriately control ignition and a combustion timing.

On the other hand, for example, Patent Literature 1 discloses an engine which injects fuel into a combustion chamber by dividing it into a succeeding injection and a preceding injection and ignites an air-fuel mixture between the succeeding injection and the preceding injection.

According to the engine disclosed in Patent Literature 1, a temperature of the air-fuel mixture can be increased by flame propagation combustion caused by the ignition, and the air-fuel mixture can be self-ignited. Therefore, a combustion start timing can be appropriately controlled by adjusting an ignition timing. In addition, combustion of the air-fuel mixture formed by the succeeding injection and the air-fuel mixture formed by the preceding injection can be started at different timings, so that a rapid rise of an in-cylinder pressure can be suppressed and deterioration of combustion noise can be suppressed.

However, a demand for thermal efficiency and combustion noise is still high, and it is required to realize suitable premixed compression ignition combustion to further increase the thermal efficiency while further reducing the combustion noise.

CITATION LIST

Patent Literature

Patent Literature 1: Japanese Unexamined Patent Publication No. 2012-241590

SUMMARY OF INVENTION

It is an object of the present invention to provide a premixed compression ignition engine capable of suppressing combustion noise while realizing appropriate premixed compression ignition combustion.

Means for Solving the Problems

In order to solve the above problems, the present invention provides a premixed compression ignition engine that includes an engine body formed with a combustion chamber and self-ignites a mixture of fuel and air in the combustion chamber, the engine including: a fuel injection device that injects fuel into the combustion chamber; an ignition device having an electrode portion that faces an inside of the combustion chamber and ignites an air-fuel mixture in the combustion chamber to apply ignition energy to the air-fuel mixture; and a control device that controls the ignition device and the fuel injection device so as to occur, in at least a part of an operation region of the engine, SPCCI combustion in which an air-fuel mixture formed in a first area of the combustion chamber that includes the electrode portion of the ignition device is burned by receiving the ignition energy applied from the ignition device, and thereafter, an air-fuel mixture formed in a second area of the combustion chamber located on an outer periphery of the first area is self-ignited and burned by a pressure rise in the combustion chamber due to the combustion of the air-fuel mixture in the first area, wherein when the control device determines that the engine is operated in a high load operation region serving as an operation region in which an engine load is higher than a reference load set to a value equal to or more than half of a maximum load of the engine and in which the SPCCI combustion is executed, the fuel injection device is controlled so that an air-fuel ratio in the entire combustion chamber becomes richer than a stoichiometric air-fuel ratio and that an air-fuel ratio of the air-fuel mixture in the first area becomes leaner than an air-fuel ratio of the air-fuel mixture in the second area at an ignition timing of the ignition device.

The present invention also provides a method for controlling a premixed compression ignition engine, the engine including a fuel injection device that injects fuel into a combustion chamber and an ignition device provided with an electrode portion that faces an inside of the combustion chamber and ignites a mixture of fuel and air in the combustion chamber to apply ignition energy to the mixture, where SPCCI combustion in which an air-fuel mixture formed in a first area of the combustion chamber that includes the electrode portion of the ignition device is burned by receiving the ignition energy applied from the ignition device, and thereafter, an air-fuel mixture formed in a second area of the combustion chamber located on an outer periphery of the first area is self-ignited and burned by a pressure rise in the combustion chamber due to the combustion of the air-fuel mixture in the first area is performed in at least a part of an operation region of the engine, the method including: a step of determining whether or not the engine is operated in a high load operation region serving as an operation region in which an engine load is higher than a reference load set to a value equal to or more than half of a maximum load of the engine and in which the SPCCI combustion is performed; and a step of controlling the fuel injection device executed when the engine is operated in the high load operation region, so that an air-fuel ratio in the entire combustion chamber becomes richer than a stoichiometric air-fuel ratio and that an air-fuel ratio of the air-fuel mixture in the first area becomes leaner than an air-fuel ratio of the air-fuel mixture in the second area at an ignition timing of the ignition device.

According to the present invention, it is possible to suppress combustion noise while realizing appropriate premixed compression ignition combustion.

BRIEF DESCRIPTION OF DRAWINGS

FIG. 10 is a view for explaining a procedure of forming an air-fuel mixture in a middle load operation region, and (1) to (4) show states inside a combustion chamber at different points in time.

DESCRIPTION OF EMBODIMENTS

An embodiment of the present invention will be described with reference to the accompanying drawings. It should be noted that the following embodiment is an example which embodies the present invention, and does not limit the technical scope of the present invention.

Figure 1:
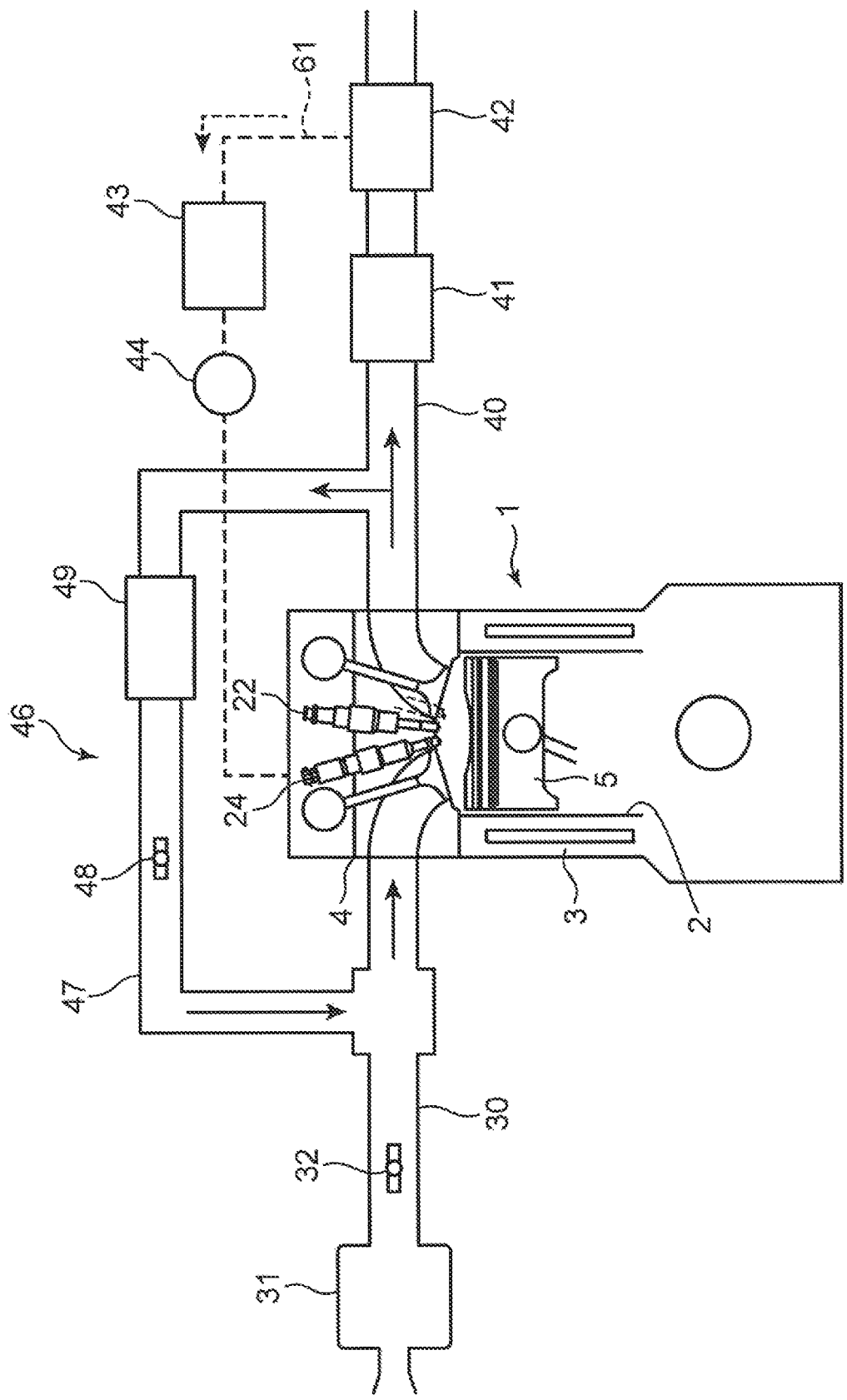
FIG. 1 is a view showing a configuration of an engine system according to an embodiment of the present invention.

FIG. 1 is a diagram showing a configuration of an engine system to which a premixed compression ignition engine of the present invention is applied. The engine system according to the present embodiment includes a four-stroke engine body 1, an intake passage 30 for introducing combustion air into the engine body 1, an exhaust passage 40 for leading out exhaust gas generated in the engine body 1.

The engine body 1 is, for example, an in-line four-cylinder engine in which four cylinders 2 are disposed in series in a direction orthogonal to a paper surface of FIG. 1. This engine system is mounted on a vehicle, and the engine body 1 is used as a drive source of the vehicle. In the present embodiment, the engine body 1 is driven by receiving supply of fuel including gasoline. Note that the fuel may be gasoline including bioethanol or the like.

(1) Engine Body

Figure 2:
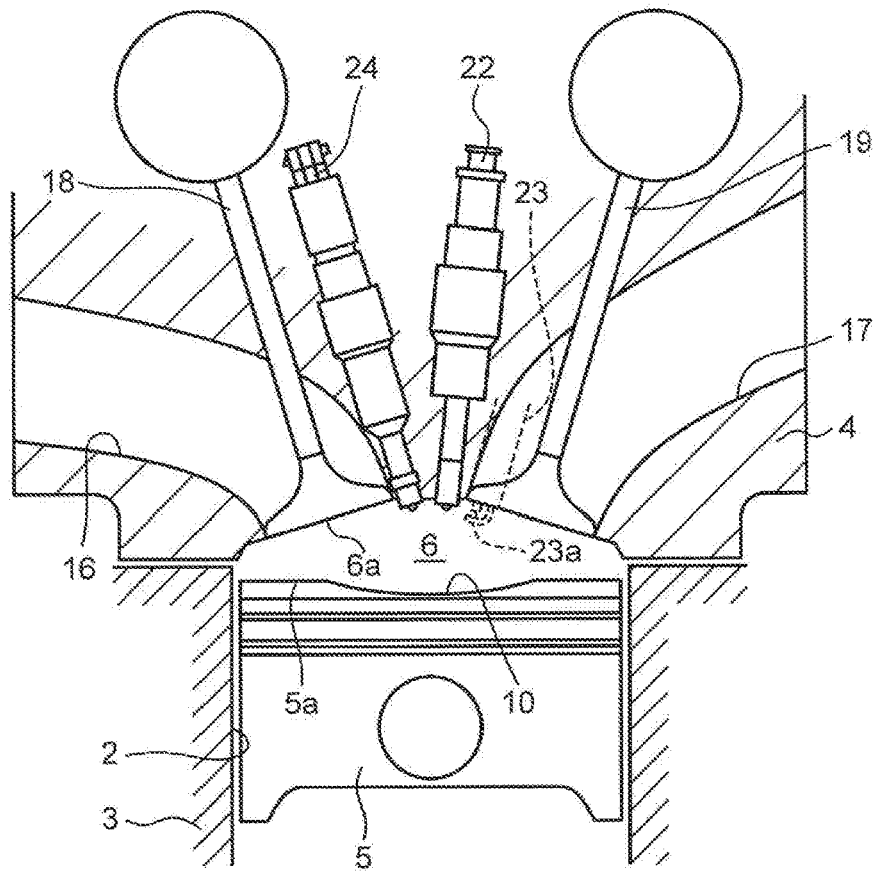
FIG. 2 is a schematic sectional view of an engine body.

FIG. 2 is a schematic sectional view of the engine body 1.

The engine body 1 includes a cylinder block 3 in which a cylinder 2 is formed, a cylinder head 4 provided on an upper surface of the cylinder block 3, a piston 5 fitted to the cylinder 2 so as to reciprocate (vertically move).

A combustion chamber 6 is formed above the piston 5. The combustion chamber 6 is a so-called pent roof type. A ceiling surface 6a of the combustion chamber 6 (hereinafter simply referred to as the combustion chamber ceiling surface 6a) constituted by a lower surface of the cylinder head 4 has a triangular roof shape composed of two inclined surfaces on an intake side and an exhaust side.

The combustion chamber ceiling surface 6a and a crown surface 5a of the piston 5 face each other. In the crown surface 5a of the piston 5 (hereinafter simply referred to as the piston crown surface 5a), a cavity 10 is formed by recessing an area including a center of the piston crown surface 5a toward a side opposite to the cylinder head 4 (downward). In this case, a space between the piston crown surface 5a and the combustion chamber ceiling surface 6a in an inner space of the cylinder 2 is referred to as the combustion chamber 6, regardless of a position of the piston 5 and a combustion state of an air-fuel mixture.

In the present embodiment, a geometric compression ratio of the engine body 1, that is, a ratio between a volume of the combustion chamber 6 when the piston 5 is at a bottom dead center and a volume of the combustion chamber 6 when the piston 5 is at a top dead center is set to 16 or more and 35 or less (for example, about 20).

The cylinder head 4 is provided with an intake port 16 for introducing air supplied from the intake passage 30 into the cylinder 2 (combustion chamber 6) and an exhaust port 17 for leading out exhaust gas generated in the cylinder 2 to the exhaust passage 40. Two intake ports 16 and two exhaust ports 17 are formed for each cylinder 2.

The cylinder head 4 is provided with intake valves 18 for opening and closing openings of the intake ports 16 on the cylinder 2 and exhaust valves 19 for opening and closing openings of the exhaust ports 17 on the cylinder 2.

The cylinder head 4 is provided with an injector (fuel injection device) 22 for injecting fuel. The injector 22 is mounted such that a tip formed with injection holes is located near a center of the combustion chamber ceiling surface 6a and faces a center of the combustion chamber 6. The injector 22 injects fuel from the vicinity of the center of the combustion chamber ceiling surface 6a toward the piston crown surface 5a. The injector 22 injects fuel in a cone shape (specifically, a hollow cone shape) with a center axis of the cylinder 2 as the center. A taper angle (spray angle) of the cone is, for example, 90° to 100°.

In the present embodiment, an injector of an outward opening type is used as the injector 22. Incidentally, the injector 22 is not limited to the outward opening type but may be of any configuration as long as it can inject fuel in a cone shape with the center axis of the cylinder 2 as the center, as described above. For example, the injector 22 may be a VCO (Valve Covered Orifice) nozzle type injector, a multi-hole type injector provided with a plurality of injection holes at a tip and injecting fuel at a predetermined spray angle, or a swirl injector that injects fuel in a hollow cone shape.

The cylinder head 4 is provided with an ignition plug (ignition device) 23 for igniting an air-fuel mixture in the combustion chamber 6. The ignition plug 23 has an electrode portion 23a on which an electrode for discharging a spark and applying ignition energy to the air-fuel mixture is formed. The ignition plug 23 is disposed such that the electrode portion 23a is located near the center of the combustion chamber ceiling surface 6a and faces the center of the combustion chamber 6.

The cylinder head 4 is further provided with a water injection device 24 for injecting water (injection water) into the combustion chamber 6. The water injection device 24 is located such that a tip formed with an injection hole is located near the center of the combustion chamber ceiling surface 6a and faces the center of the combustion chamber 6. The water injection device 24 injects water from the vicinity of the center of the combustion chamber ceiling surface 6a toward the piston crown surface 5a. The water injection device 24 injects water in a cone shape (specifically, a hollow cone shape) with the center axis of the cylinder 2 as the center. A taper angle (spray angle) of this cone is, for example, 90° to 100°. The water injection device 24 has, for example, a structure similar to that of the injector 22. Hereinafter, the water sprayed into the combustion chamber 6 by the water injection device 24 is referred to as injection water as appropriate.

Figure 3:
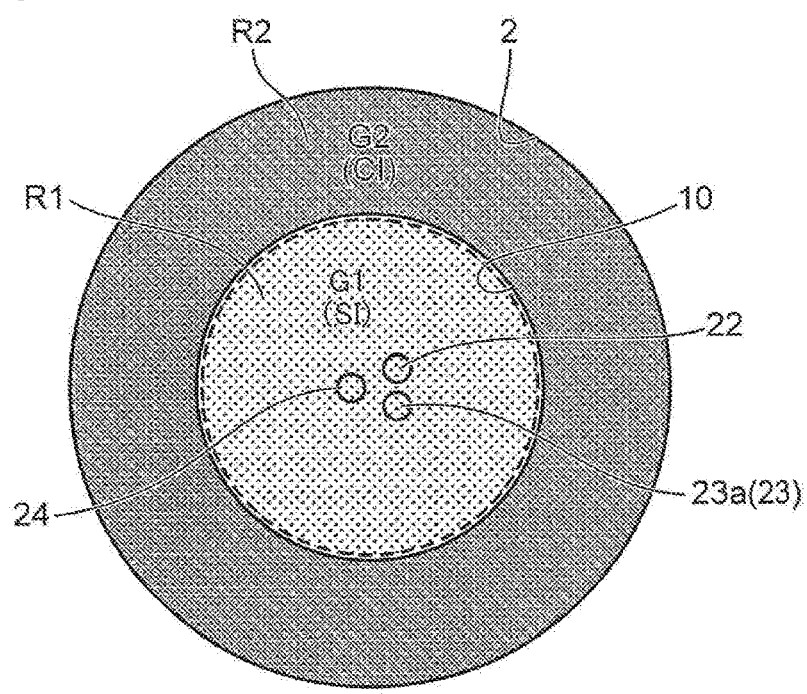
FIG. 3 is a schematic sectional view of a combustion chamber.

As shown in FIGS. 2 and 3 (FIG. 3 is a schematic sectional view of the combustion chamber 6), the injector 22 and the water injection device 24 are disposed so that their tips are close to each other in the vicinity of the center of the combustion chamber ceiling surface 6a. The ignition plug 23 is disposed such that its electrode portion 23a is closer to the tip of the injector 22 than the tip of the water injection device 24.

As shown in FIG. 1, in the intake passage 30, an air cleaner 31 and a throttle valve 32 for opening and closing the intake passage 30 are provided in order from an upstream side. In the present embodiment, during operation of the engine, the throttle valve 32 is basically kept fully open or nearly fully open. The throttle valve 32 is closed only under limited operating conditions such as when the engine is stopped, thereby shutting off the intake passage 30.

In the exhaust passage 40, a purification device 41 for purifying exhaust and a condenser 42 are provided in order from the upstream side. For example, the purification device 41 incorporates a three-way catalyst.

The condenser 42 condenses water (water vapor) in the exhaust gas passing through the exhaust passage 40. The condenser 42 and the water injection device 24 are connected by a water supply passage 61. The condensed water produced by the condenser 42 is supplied to the water injection device 24 via the water supply passage 61. As described above, in the present embodiment, the water injection device 24 injects the water generated from the exhaust gas into the combustion chamber 6. More specifically, the water supply passage 61 is provided with a water tank 43 for storing the condensed water generated by the condenser 42 and a water pump 44 for pressure-feeding the water in the water tank 43. The condensed water is supplied from the water tank 43 to the water injection device 24 by the water pump 44.

In the exhaust passage 40, an EGR device 46 for returning a part of the exhaust gas passing through the exhaust passage 40 as EGR gas to the intake passage 30 is provided. The EGR device 46 has an EGR passage 47 that communicates a portion of the intake passage 30 on a downstream side of the throttle valve 32 and a portion of the exhaust passage 40 on an upstream side of the purification device 41 and an EGR valve 48 that opens and closes the EGR passage 47. Further, in the present embodiment, an EGR cooler 49 for cooling the EGR gas passing through the EGR passage 47 is provided in the EGR passage 47. The EGR gas is cooled by the EGR cooler 49 and then recirculated to the intake passage 30.

(2) Control System (2-1) System Configuration

Figure 4:
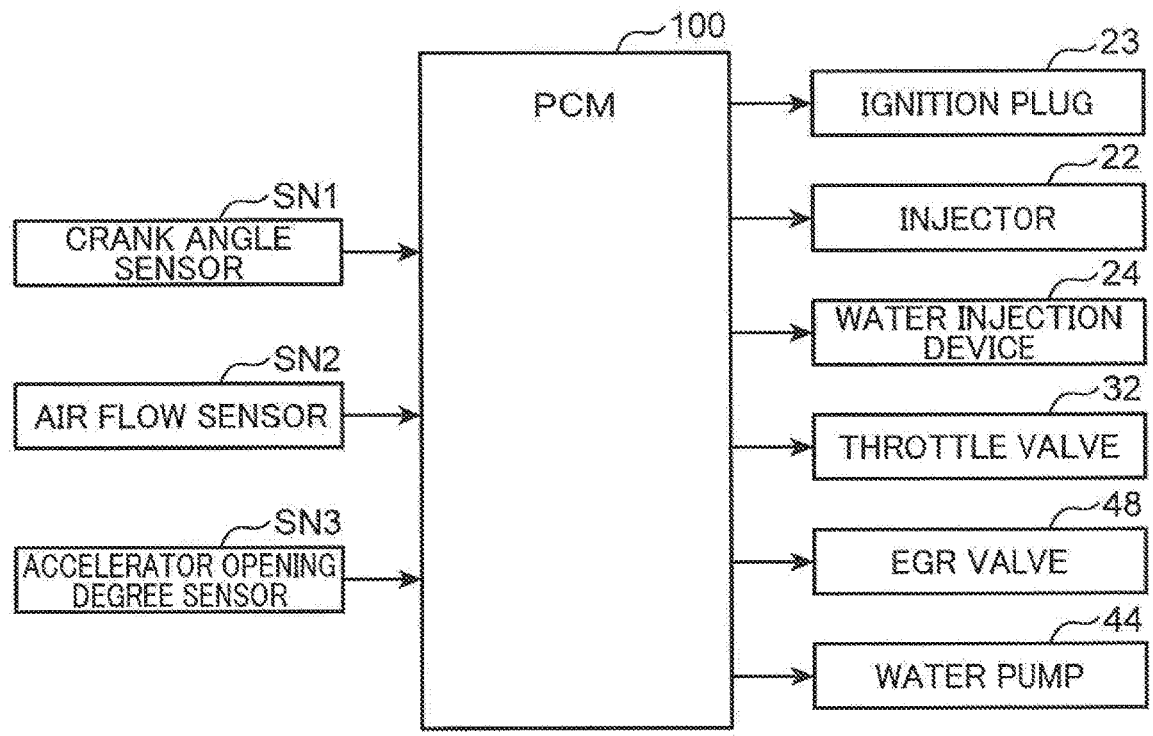
FIG. 4 is a block diagram showing a control system of an engine.

FIG. 4 is a block diagram showing a control system of the engine. As shown in FIG. 4, the engine system of the present embodiment is totally controlled by a PCM (Powertrain Control Module, control unit) 100. As is well known, the PCM 100 is a microprocessor composed of a CPU, a ROM, a RAM, and the like.

Various sensors are provided in the vehicle, and the PCM 100 is electrically connected to these sensors. For example, the cylinder block 3 is provided with a crank angle sensor SN1 for detecting engine speed. The intake passage 30 is provided with an air flow sensor SN2 that detects an amount of air taken into each cylinder 2 through the intake passage 30. The vehicle is provided with an accelerator opening degree sensor SN3 for detecting an opening degree (accelerator opening degree) of an accelerator pedal (not shown) operated by a driver.

The PCM 100 executes various calculations based on input signals from these sensors SN1 to SN3, etc., and controls the engine parts such as the ignition plug 23, the injector 22, the water injection device 24, the throttle valve 32, the EGR valve 48, and the water pump 44.

In the present embodiment, the EGR valve 48 is opened in an entire operation region, and the EGR gas is recirculated to the intake passage 30 in the entire operation region.

Further, in order to increase thermal efficiency, an ignition timing of the ignition plug 23 (a timing at which the ignition plug 23 ignites an air-fuel mixture) is controlled so that the center of gravity of a heat generation rate (a timing at which combustion of 50% of a total amount (mass) of fuel supplied to the combustion chamber 6 is completed) is in an expansion stroke in the entire operation region.

Further, in the present embodiment, premixed compression ignition combustion is performed in the entire operation region. However, various controls for realizing the premixed compression ignition combustion differ depending on the operation region.

Figure 5:
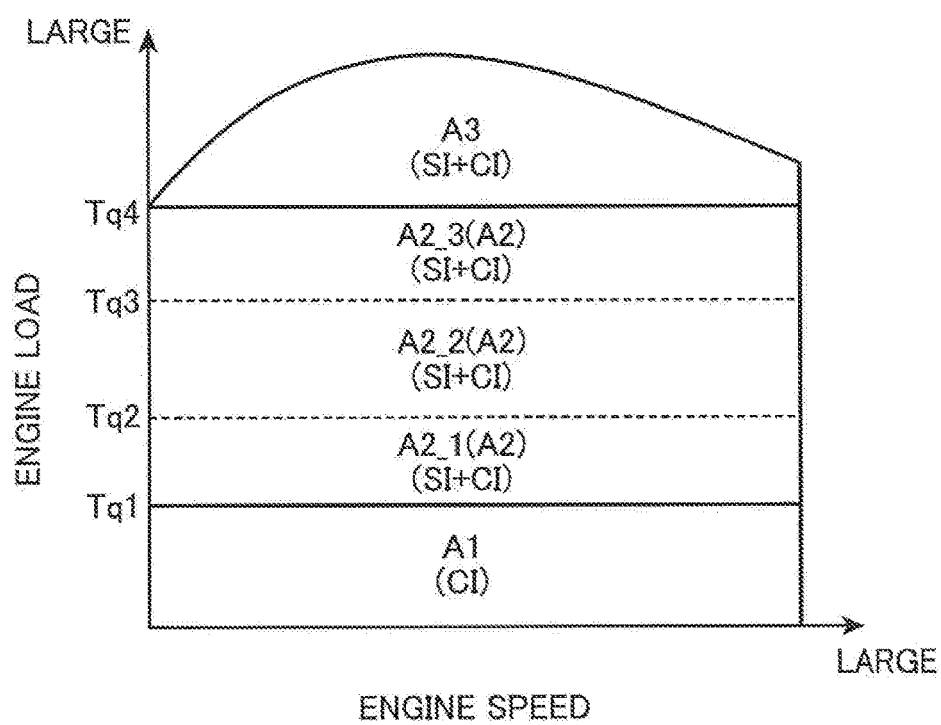
FIG. 5 is a diagram showing a control map.

FIG. 5 is a control map in which a horizontal axis represents engine speed and a vertical axis represents an engine load. In the present embodiment, as a control region, a low load operation region A1 in which the engine load is equal to or smaller than a first load Tq1 set in advance, a middle load operation region A2 in which the engine load is larger than the first load Tq1 and equal to or smaller than a fourth load (reference load) Tq4, and a high load operation region A3 in which the engine load is higher than the fourth load Tq4 are set. Further, the middle load operation region A2 is divided into a middle load first region A2_1 in which the engine load is equal to or smaller than a second load Tq2, a middle load second region A2_2 in which the engine load is larger than the second load Tq2 and equal to or smaller than a third load Tq3, and a middle load third region A2_3 in which the engine load is larger than the third load Tq3. The contents of control in each of the operation regions A1 to A3 performed by the PCM 100 will be described below. The fourth load Tq4 is set to a value equal to or larger than half of a full load. In other words, the fourth load Tq4 is set to a value equal to or larger than half of the engine load corresponding to a maximum torque that the engine body can output.

The PCM 100 determines which operation region the engine body is currently operated. For example, the PCM 100 executes a step of determining whether or not the engine is operated in the high load operation region A3 and a step of determining whether or not the engine is operated with the engine load being the fourth load Tq4. Based on the determination result, the PCM 100 executes control (step) according to each operation region described below.

(2-2) Low Load Operation Region A1

Figure 6:
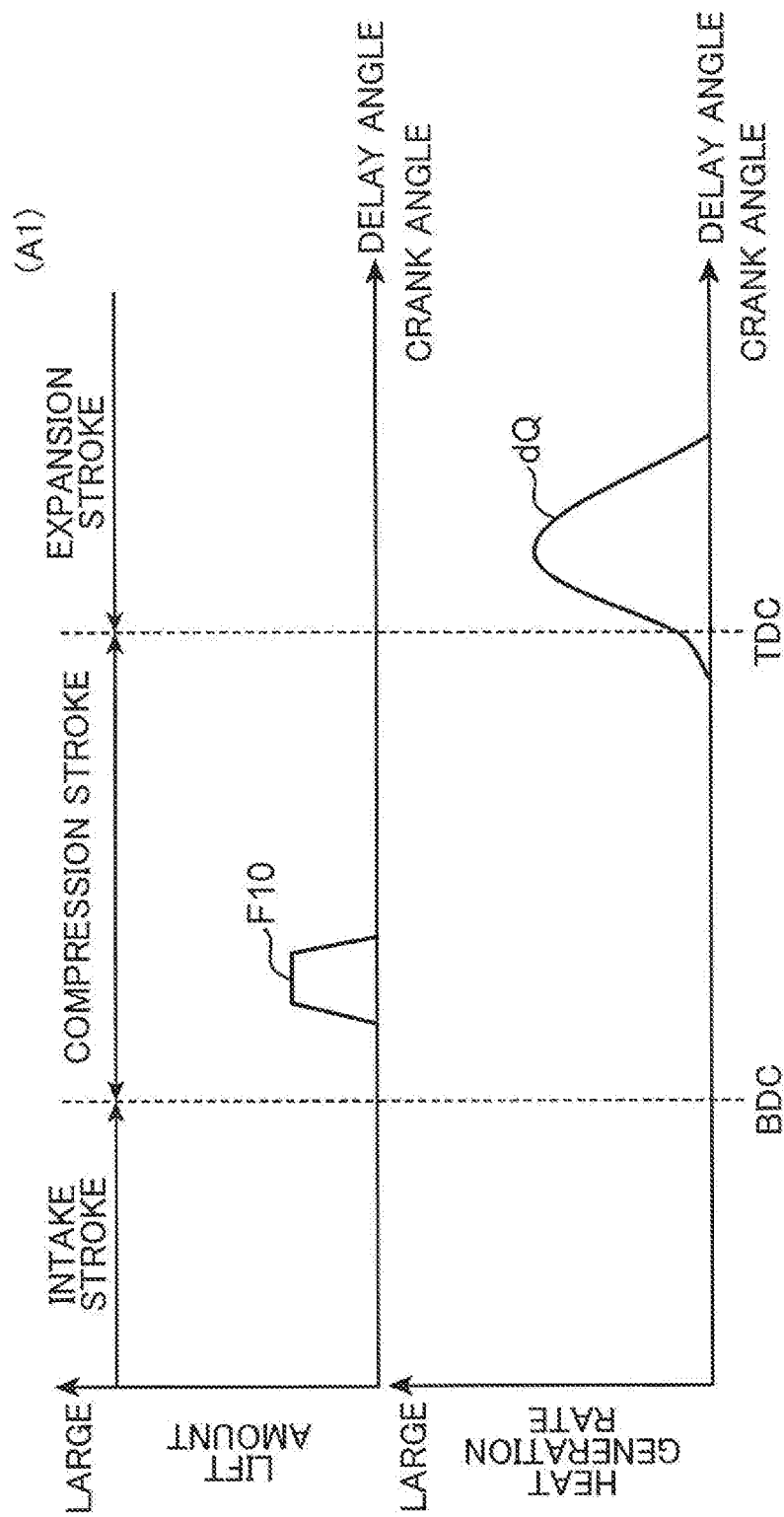
FIG. 6 is a schematic diagram showing a fuel injection pattern and a heat generation rate in a low load operation region.

FIG. 6 schematically shows a fuel injection pattern and a heat generation rate dQ in the low load operation region A1. As shown in FIG. 6, a batch injection F10 is performed in the low load operation region A1, and an entire amount of fuel supplied to the combustion chamber 6 in one combustion cycle is injected from the injector 22 into the combustion chamber 6 in a first half of a compression stroke. This injected fuel amount (amount of fuel injected from the injector 22) is calculated from an engine load calculated from an accelerator opening degree and the like, engine speed, and the like.

In the low load operation region A1, as described above, the entire amount of fuel is injected into the combustion chamber 6 in the first half of the compression stroke to mix with air. Then, this mixture of fuel and air is heated and pressurized by compression action of the piston 5 to be self-ignited near a compression top dead center. Accordingly, the premixed compression ignition combustion is realized.

In the low load operation region A1, water injection by the water injection device 24 is stopped.

(2-3) Middle Load Operation Region

In the middle load operation region A2, the premixed compression ignition combustion by ignition assist, that is, SPCCI (SPark Controlled Compression Ignition) combustion is performed. In other words, the ignition plug 23 discharges in the air-fuel mixture formed in the combustion chamber 6, and an air-fuel mixture around the ignition plug 23 is forcibly ignited. Then, flame propagates from the periphery of the ignition plug 23 to the surroundings, a temperature of a surrounding air-fuel mixture is raised, and the air-fuel mixture can be self-ignited.

In the middle load operation region A2, the fuel is injected from the injector 22 so that an air-fuel ratio of a first air-fuel mixture G1 formed in a central area (first area) R1 and an area of the combustion chamber 6 that includes the electrode portion 23a of the ignition plug 23 (includes an area where the electrode portion 23a is disposed) is leaner than a stoichiometric air-fuel ratio (an air-fuel ratio A/F of the air-fuel mixture is larger than the stoichiometric air-fuel ratio, and an excess air ratio λ of the air-fuel mixture is larger than 1) at an ignition timing. In the middle load operation region A2, the fuel is injected from the injector 22 so that an air-fuel ratio of a first air-fuel mixture G1 is equal to or larger than an air-fuel ratio of a second air-fuel mixture G2 formed in an outer peripheral area (second area) R2 of the combustion chamber 6 located on an outer periphery of the first area R1 at an ignition timing. Then, as shown in FIG. 3, the first air-fuel mixture G1 formed in the central area R1 is subjected to flame propagation combustion (SI combustion), and the second air-fuel mixture G2 formed in the outer peripheral area R2 is subjected to compression self-ignition combustion (CI combustion).

In the present embodiment, as shown in FIG. 3, the central area R1 is approximately an area in which the cavity 10 is formed as seen from a direction along the center axis of the cylinder 2. The outer peripheral area R2 is an area outside the cavity 10 in a radial direction of the cylinder 2.

Figure 7:
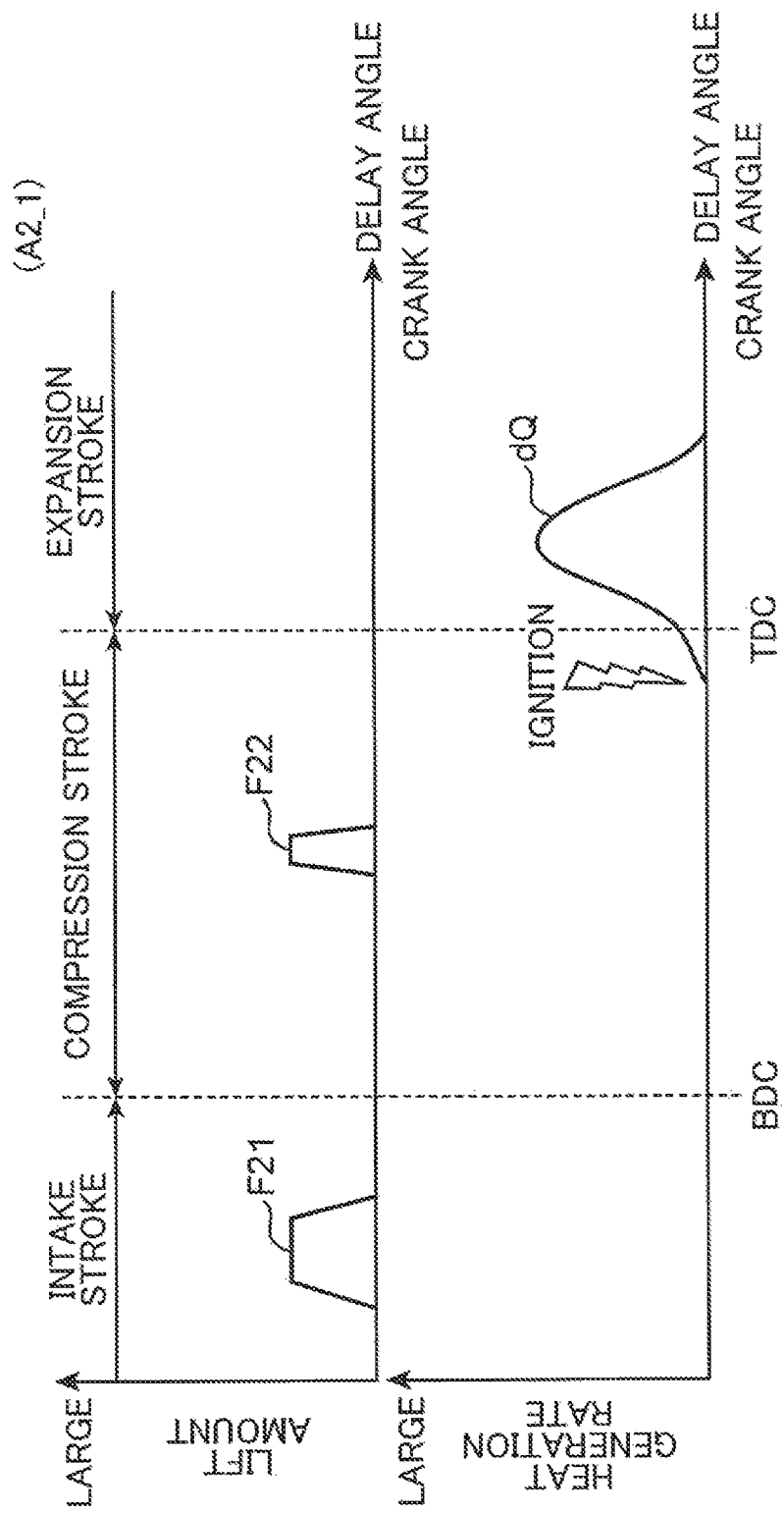
FIG. 7 is a schematic diagram showing a fuel injection pattern and a heat generation rate in a middle load first region.
Figure 8:
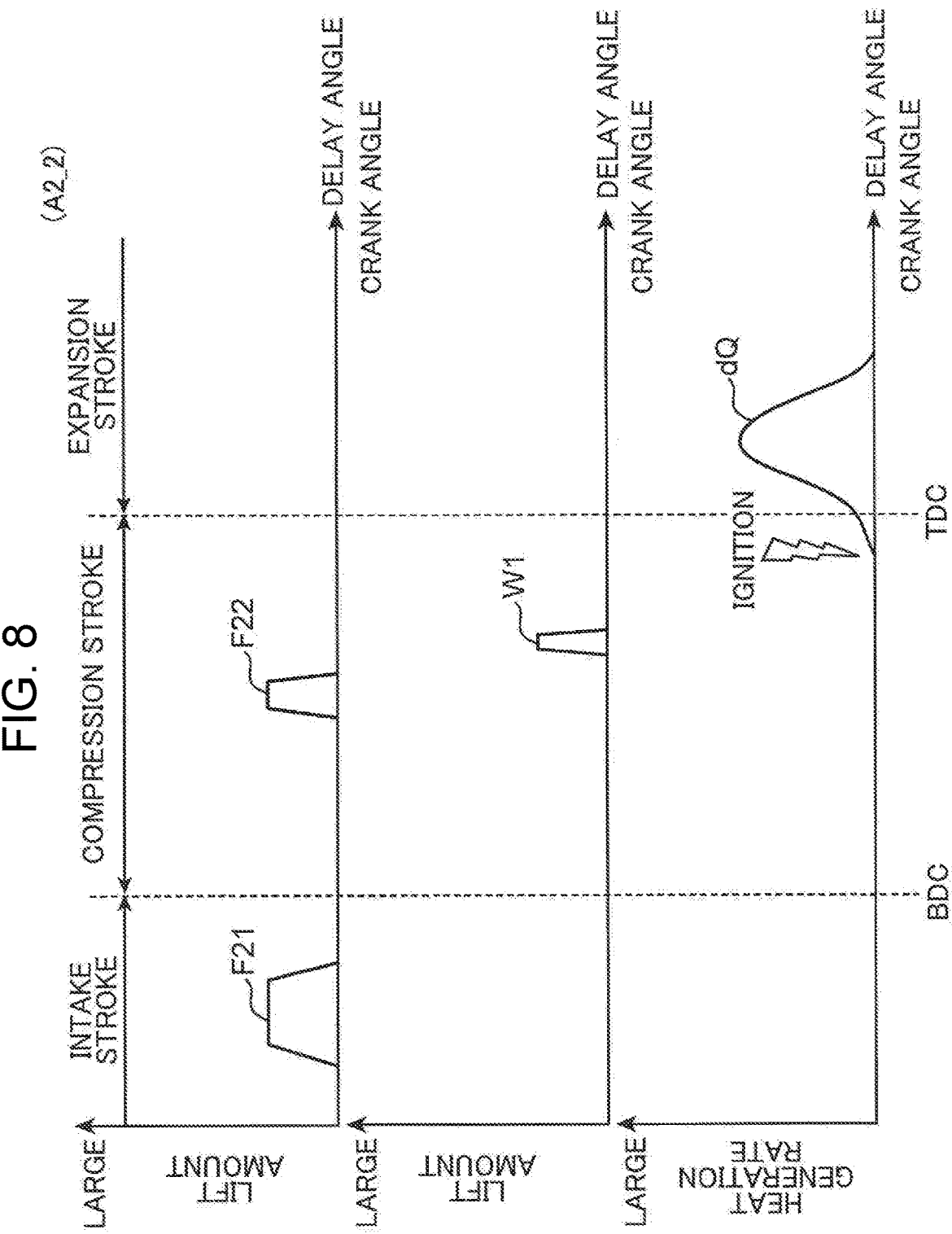
FIG. 8 is a schematic diagram showing a fuel injection pattern, a water injection pattern, and a heat generation rate in a middle load second region.
Figure 9:
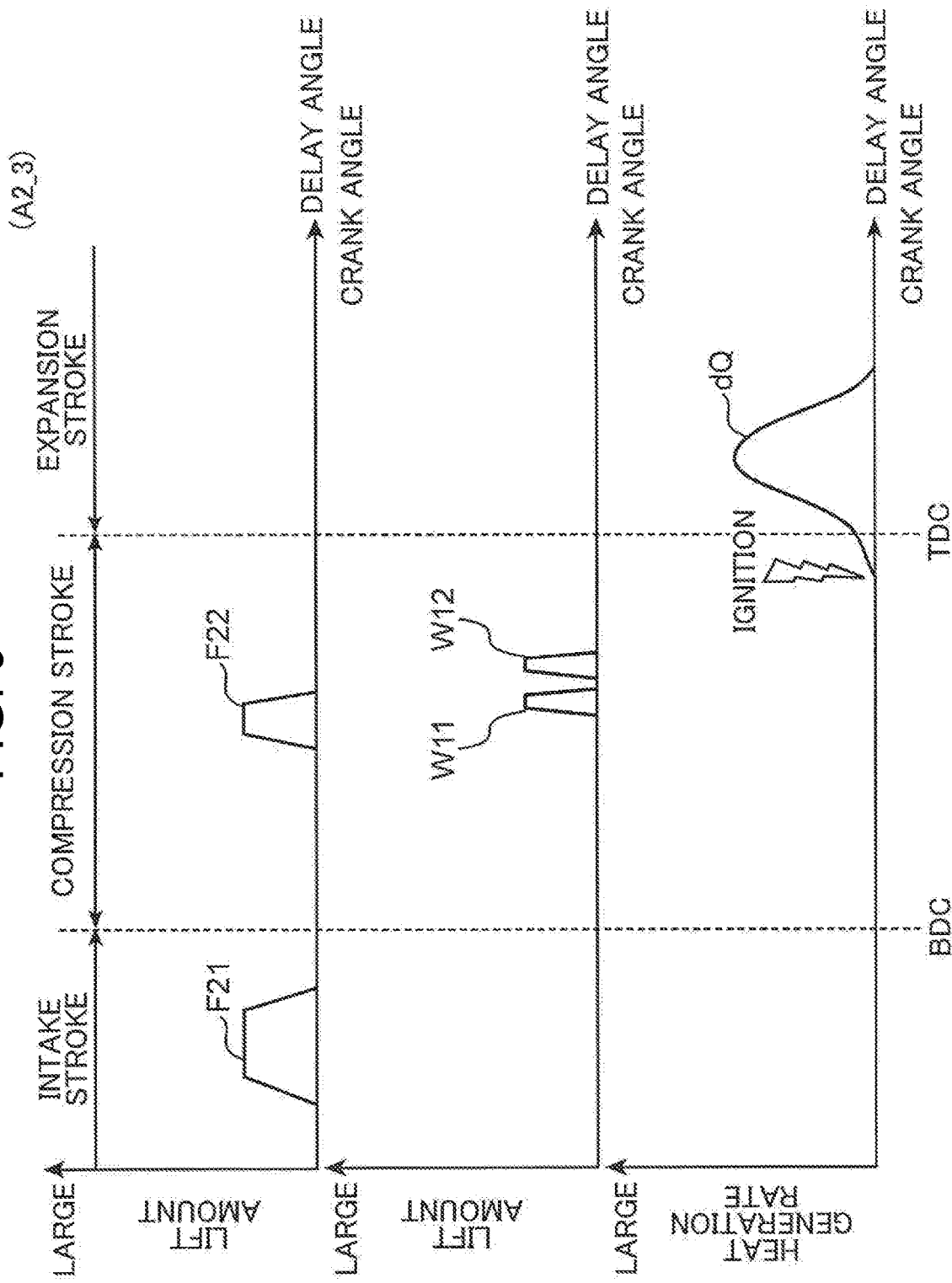
FIG. 9 is a schematic diagram showing a fuel injection pattern, a water injection pattern, and a heat generation rate in a middle load third region.

FIGS. 7, 8 and 9 schematically show a fuel injection pattern, an ignition timing, and a heat generation rate in the middle load first region A2_1, the middle load second region A2_2, and the middle load third region A2_3, respectively. In the middle load second region A2_2 and the middle load third region A2_3, water injection is performed as described later, and water injection patterns are shown together in FIGS. 8 and 9.

As shown in FIGS. 7, 8, and 9, in the middle load operation region A2, the fuel injection patterns in the regions A2_1 to A2_3 are substantially the same, and the fuel is injected twice into the combustion chamber 6. As a result, air-fuel mixtures having different air-fuel ratios are formed in the central area R1 and the outer peripheral area R2.

FIG. 10 is a view for explaining a procedure of forming the air-fuel mixture in the middle load operation region A2. Chart (1) to (4) of FIG. 10 are views schematically showing states inside the combustion chamber 6 at different times. In (1) to (4) of FIG. 10, time passes in this order. Chart (1) of FIG. 10 shows a state inside the combustion chamber 6 during an intake stroke. Chart (2) to (4) of FIG. 10 show a state inside the combustion chamber 6 during a compression stroke.

As shown in Chart (1) of FIG. 10, the injector 22 executes first fuel injection F21 for diffusing the fuel to an entire area of the combustion chamber 6. Then, second fuel injection F22 is executed after the end of the first fuel injection F21.

The first fuel injection F21 is performed in the intake stroke or in a first half of the compression stroke (within a period from a start timing of the intake stroke to an end timing of the first half of the compression stroke). In the present specification, a first stage, a middle stage, and a latter stage of a certain stroke such as the compression stroke refer to a first stage, a middle stage, and a latter stage when this stroke is trisected, and a first half and a second half of the certain stroke refer to a first half and a second half when this stroke is bisected.

An injection amount of the first fuel injection F21 (amount of fuel injected into the combustion chamber 6 by the first fuel injection F21) is made smaller than a value obtained by dividing air existing in the combustion chamber 6 by the stoichiometric air-fuel ratio.

As shown in Chart (2) of FIG. 10, after a while after the execution of the first fuel injection F21, the fuel injected into the combustion chamber 6 by the first fuel injection F21 is diffused to almost the entire area of the combustion chamber 6. As a result, an air-fuel mixture leaner than the stoichiometric air-fuel ratio and substantially homogeneous is formed in the combustion chamber 6. Here, if the first fuel injection F21 is executed in the first half of the intake stroke and at a timing at which a flow rate of the air flowing into the combustion chamber 6 from the intake port 16 is relatively high, the fuel injected by the first fuel injection F21 is more reliably diffused into the entire combustion chamber 6, so that a homogeneous air-fuel mixture can be more reliably formed.

Next, the injector 22 executes the second fuel injection F22 for unevenly locating the fuel in the outer peripheral area R2. Specifically, as shown in Chart (3) of FIG. 10, the second fuel injection F22 is performed at such a timing that the fuel injected from the injector 22 collides with a peripheral portion 10c of the cavity 10.

As shown in Chart (3) of FIG. 10, the fuel injected in this manner reaches the peripheral portion 10c of the cavity 10 and then flows toward the ceiling surface 6a of the combustion chamber 6 along the peripheral portion 10c of the cavity 10. The fuel is introduced into an outer periphery side of the cavity 10, that is, the outer peripheral area R2. For example, the second fuel injection F22 is performed in the middle stage of the compression stroke (from BTDC 120° CA to BTDC 60° CA).

In the middle load operation region A2, the mixture in the combustion chamber 6 is stratified by the second fuel injection F22, as shown in Chart (4) of FIG. 10. In other words, an air-fuel mixture (first air-fuel mixture G1) that is a mixture of air and the fuel injected into the combustion chamber 6 by the first fuel injection F21 and is leaner than the stoichiometric air-fuel ratio is formed in the central area R1. Then, an air-fuel mixture (second air-fuel mixture G2) which is a mixture of air, the fuel injected into the combustion chamber 6 by the first fuel injection F21, and the fuel injected into the combustion chamber 6 by the second fuel injection F22 and is richer (smaller in air-fuel ratio) than the air-fuel mixture in the central area R1 formed only by the fuel of the first fuel injection F21 is formed in the outer peripheral area R2. This stratified state is maintained until the ignition timing. At the ignition timing as well, the air-fuel mixture leaner than the stoichiometric air-fuel ratio exists in the central area R1, and the air-fuel mixture richer than the air-fuel mixture in the central area R1 exists in the outer peripheral area R2.

After the second fuel injection F22 is performed, ignition of the air-fuel mixture is performed by the ignition plug 23. For example, ignition of the air-fuel mixture is performed at timing more on an advance angle side than the compression top dead center.

Figure 11:
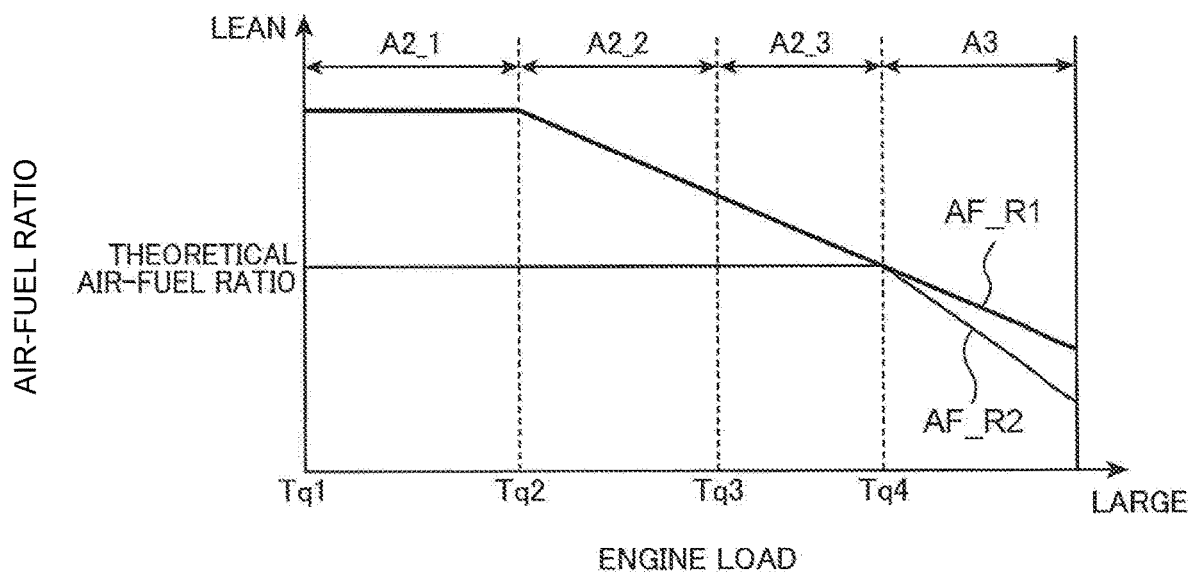
FIG. 11 is a graph showing a relationship between an engine load and air-fuel ratios of air-fuel mixtures in a central area and an outer peripheral area.

FIG. 11 is a graph showing a relationship between the engine load and the air-fuel ratio (air-fuel ratio at an ignition timing) of the air-fuel mixture in each of the areas R1, R2, in the middle load operation region A2 and the high load operation region A3.

As shown in FIG. 11, in the middle load operation region A2, an air-fuel ratio AF_R2 of the air-fuel mixture in the outer peripheral area R2 at the ignition timing is set to the stoichiometric air-fuel ratio irrespective of the engine load.

In the middle load operation region A2, an air-fuel ratio AF_R1 of the air-fuel mixture in the central area R1 is controlled to a constant value (for example, about 20) irrespective of the engine load when the engine load does not exceed the second load Tq2. When the engine load exceeds the second load Tq2, the air-fuel ratio AF_R1 becomes rich (is reduced) as the engine load increases. For example, when the engine load exceeds the second load Tq2, the air-fuel ratio AF_R1 is reduced in proportion to the engine load. In order to realize this, in the middle load operation region A2, when the engine load does not exceeds the second load Tq2, a ratio between the injection amount of the first fuel injection F21 and an injection amount of the second fuel injection F22 is kept almost constant irrespective of the engine load. On the other hand, when the engine load exceeds the second load Tq2, as the engine load increases, a ratio of the injection amount of the first fuel injection F21 (a ratio of the injection amount of the first fuel injection F21 to a total amount of the fuel supplied to the combustion chamber 6 per one combustion cycle) is increased, and a ratio of the injection amount of the second fuel injection F22 (a ratio of the injection amount of the second fuel injection F22 to the total amount of the fuel supplied to the combustion chamber 6 per one combustion cycle) is reduced.

As shown in FIG. 11, in the present embodiment, in a boundary between the middle load operation region A2 and the high load operation region A3, that is, under the operating condition in which the engine load is the fourth load Tq4, the air-fuel ratio AF_R1 of the air-fuel mixture in the central area R1 is set to the stoichiometric air-fuel ratio. Accordingly, under the operating condition where the engine load is the fourth load Tq4, both of the air-fuel ratio AF_R1 of the air-fuel mixture in the central area R1 and the air-fuel ratio AF_R2 of the air-fuel mixture in the outer peripheral area R2 are the same stoichiometric air-fuel ratio. Note that under the operating condition where the engine load is the fourth load Tq4, the second fuel injection F22 is stopped.

The water injection patterns in the regions A2_1 to A2_3 of the middle load operation region A2 are different from each other. Next, the water injection patterns will be described.

In the middle load first region A2_1, water injection by the water injection device 24 is stopped.

In the middle load second region A2_2, water injection by the water injection device 24 is performed. In the middle load second region A2_2, the water injection pattern is an injection pattern in which injection water exists only in the outer peripheral area R2 at the ignition timing.

Specifically, in the middle load second region A2_2, as the second fuel injection F22 shown in Chart (3) of FIG. 10, water injection W1 is performed only once at a timing at which the water injected from the water injection device 24 reaches the peripheral portion 10c of the cavity 10 (for example, the middle stage of the compression stroke) during one combustion cycle, so that the injection water is introduced only to the outer peripheral area R2.

Also in the middle load third region A2_3, water injection by the water injection device 24 is performed. However, in the middle load third region A2_3, the water injection pattern is a pattern in which the injection water exists in both the central area R1 and the outer peripheral area R2 at the ignition timing. At this time, a concentration of water in the outer peripheral area R2 is made higher than a concentration of water in the central area R1.

Specifically, first, water injection W11 is performed at a timing at which the injection water is diffused throughout the combustion chamber 6. Thereafter, similar to the water injection W1 in the middle load second region A2_2, additional water injection W12 is performed at timing when the injection water reaches the peripheral portion 10c of the cavity 10 and is introduced only to the outer peripheral area R2. For example, as shown in FIG. 9, the first water injection W11 is performed at a relatively early timing in the middle stage of the compression stroke, and then the next water injection W12 is performed at a relatively later timing of the compression stroke. As a result, an air-fuel mixture having a relatively low concentration of the injection water is formed in the central area R1 by the first water injection W11, and the concentration of the injection water in the outer peripheral area R2 is increased by the next water injection W12.

Figure 12:
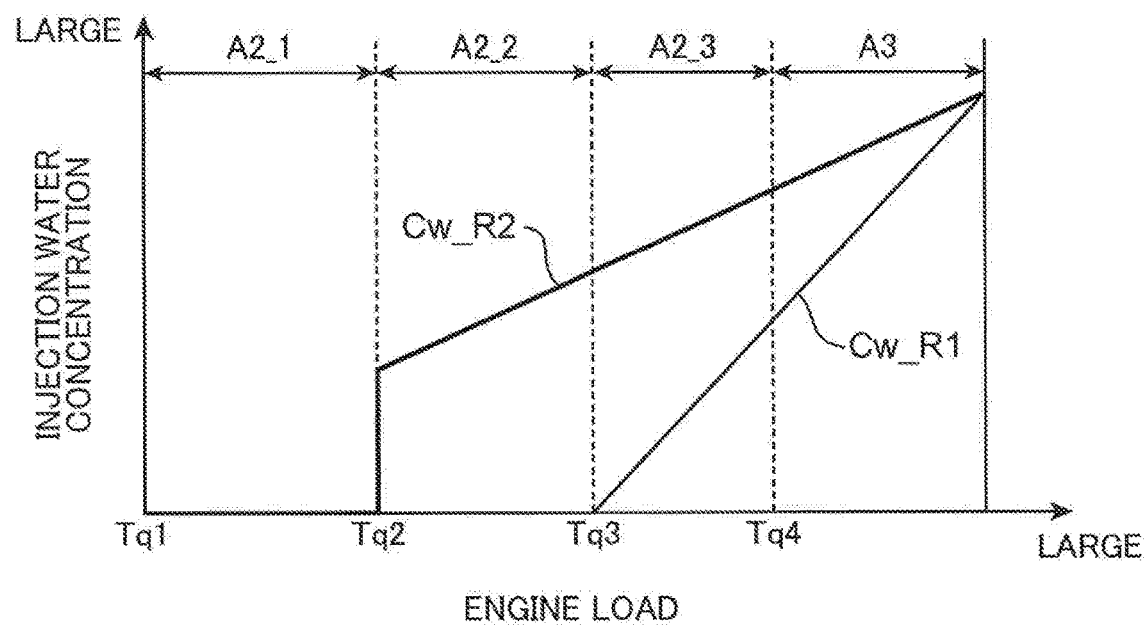
FIG. 12 is a graph showing a relationship between the engine load and concentrations of injection water in the central area and the outer peripheral area.

FIG. 12 is a graph showing a relationship between the engine load and the concentration of the injection water (the concentration of the injection water at the ignition timing) in each of the areas R1 and R2. As shown in FIG. 12, in the present embodiment, in the operation region including the middle load second region A2_2 and the middle load third region A2_3, as the engine load increases, a concentration Cw_R2 of the injection water in the outer peripheral area R2 is increased. In the middle load third region A2_3, as the engine load increases, a concentration Cw_R1 of the injection water in the central area R1 is increased. In the middle load third region A2_3, a rate of increase in the concentration of the injection water with respect to the engine load is larger in the central area R1. Accordingly, in the middle load third region A2_3, as the engine load increases, a difference between the concentration Cw_R2 of the injection water in the outer peripheral area R2 and the concentration Cw_R1 of the injection water in the central area R1 is reduced.

In FIGS. 7 to 9, the water injections W1, W11, and W12 are executed after the second fuel injection F22, but the water injection timing and the fuel injection timing can be independently set. The water injection W1 in the middle load second region A2_2 and the water injection W11 and W12 in the middle load third region A2_3 may be performed before the second fuel injection F22. For example, the first water injection W11 in the middle load third region A2_3 may be performed during the intake stroke. However, the water injection W1 in the middle load second region A2_2 and the latter water injection W12 in the middle load third region A2_3 are performed in the middle stage of the compression stroke as described above, so that the injection water can exist only in the outer peripheral area R2 more reliably.

(2-4) High Load Operation Region

Figure 13:
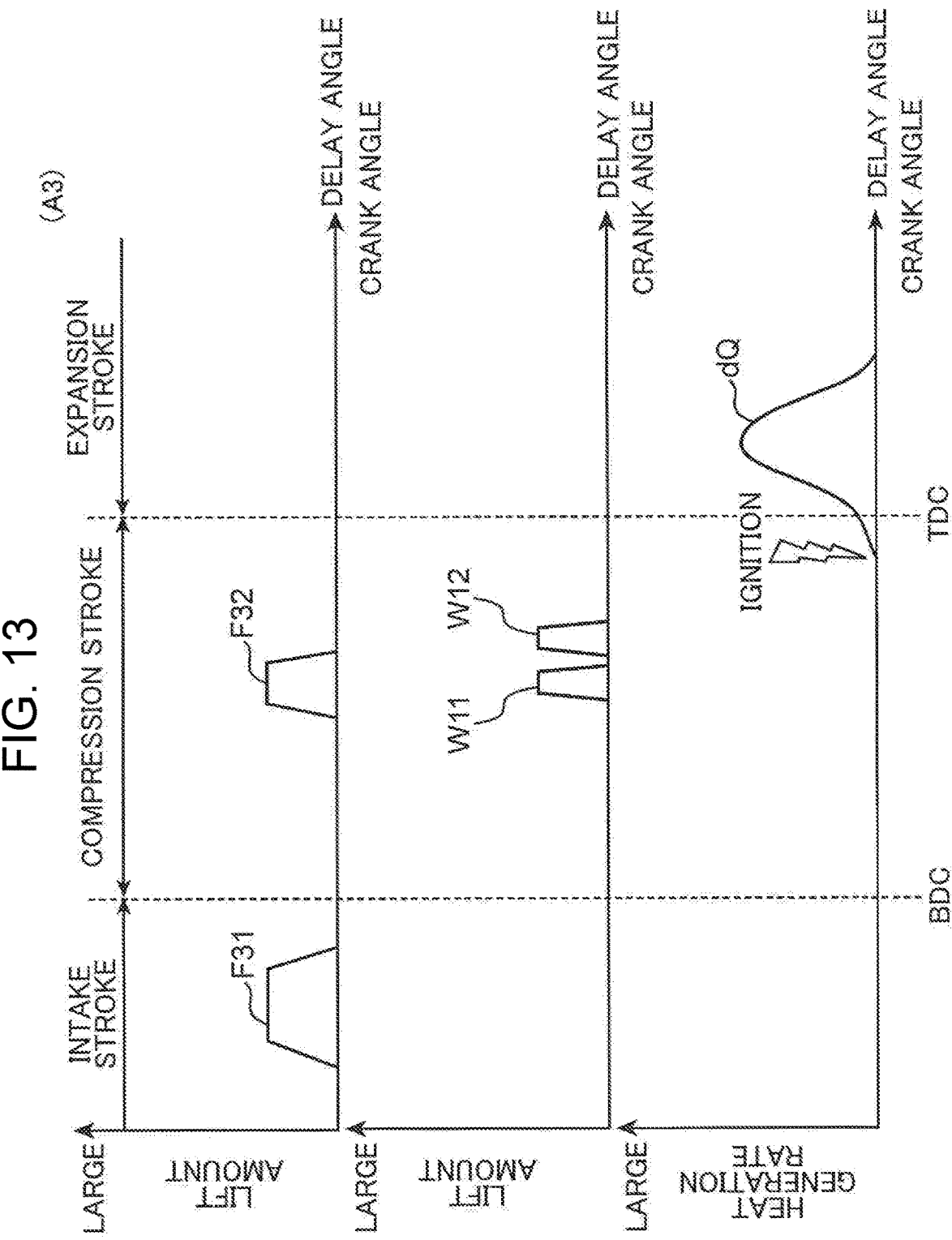
FIG. 13 is a schematic diagram showing a fuel injection pattern, a water injection pattern, and a heat generation rate in a high load operation region.

FIG. 13 schematically shows a fuel injection pattern, a water injection pattern, ignition timing, and a heat generation rate in the high load operation region A3.

Even in the high load operation region A3, the premixed compression ignition combustion (SPCCI combustion) by ignition assist is performed in the entire region in the same manner as in the middle load operation region A2. Also in the high load operation region A3, in the entire region, similarly to the middle load operation region A2 (except when the engine load is the fourth load Tq4), at the ignition timing, fuel is injected from the injector 22 so that the air-fuel ratio AF_R1 of the air-fuel mixture in the central area R1 is leaner than the air-fuel ratio AF_R2 of the air-fuel mixture in the outer peripheral area R2 (F31, F32).

However, in the high load operation region A3, as shown in FIG. 11, the air-fuel ratio AF_R1 of the air-fuel mixture in the central area R1 and the air-fuel ratio AF_R2 of the air-fuel mixture in the outer peripheral area R2 are richer than the stoichiometric air-fuel ratio (less than the stoichiometric air-fuel ratio, an excess air ratio λ<1).

In the present embodiment, as described above, the air-fuel ratios of the air-fuel mixtures in the central area R1 and the outer peripheral area R2 at the fourth load Tq4 are set to substantially the stoichiometric air-fuel ratio. When the engine load exceeds the fourth load Tq4, the air-fuel ratios of the air-fuel mixtures in these areas R1, R2 are made richer than the stoichiometric air-fuel ratio. When the engine load exceeds the fourth load Tq4, the air-fuel ratios of the air-fuel mixtures in these areas R1, R2 decrease as the engine load increases. For example, when the engine load exceeds the fourth load Tq4, the air-fuel ratios of the air-fuel mixtures in these areas R1 and R2 are reduced in proportion to the engine load as the engine load increases.

In the high load operation region A3, water injection into the combustion chamber 6 is performed with the same injection pattern as the water injection pattern in the middle load third region A2_3. In other words, in the high load operation region A3, injection water exists in the central area R1 and the outer peripheral area R2 at the ignition timing, and the water injection is performed so that the concentration Cw_R2 of the injection water in the outer peripheral area R2 is higher than the concentration Cw_R1 of the injection water in the central area R1 (W11, W12).

As shown in FIG. 12, also in the high load operation region A3, as in the middle load third region A2_3, the higher the engine load is, the higher the concentration Cw_R1 of the injection water in the central area R1 and the concentration Cw_R2 of the injection water in the outer peripheral area R2. Also in the high load operation region A3, as the engine load increases, a difference between the concentration Cw_R2 of the injection water in the outer peripheral area R2 and the concentration Cw_R1 of the injection water in the central area R1 is reduced. In the present embodiment, when the engine load is the maximum load, that is, in a so-called full load, the concentrations are controlled so that the concentration Cw_R2 of the injection water in the outer peripheral area R2 and the concentration Cw_R1 of the injection water in the central area R1 coincide with each other.

(3) Effects

As described above, in the present embodiment, the premixed compression ignition combustion is realized in the entire operation regions A1 to A3. Therefore, thermal efficiency can be enhanced.

In addition, the ignition assist is performed in the middle load operation region A2 and the high load operation region A3. Therefore, by adjusting the ignition timing in these operation regions A2, A3, it is possible to control a combustion start timing at an appropriate timing. In other words, controllability of the combustion start timing can be enhanced.

Here, in the middle load operation region A2 and the high load operation region A3, as the total amount of fuel supplied to the combustion chamber 6 increases and an amount of heat generation increases, combustion noise tends to increase.

On the other hand, in the present embodiment, in the middle load operation region A2, the ignition assist is carried out in a state in which the air-fuel ratio AF_R1 of the air-fuel mixture in the central area R1 including the electrode portion 23a of the ignition plug 23 is leaner than the air-fuel ratio AF_R2 of the air-fuel mixture in the outer peripheral area R2. Therefore, it is possible to slow the flame propagation combustion in the central area R1 caused by the application of the ignition energy to the air-fuel mixture and to suppress a rapid temperature rise in the combustion chamber 6. In addition, it is possible to prevent the compression self-ignition combustion of the air-fuel mixture in the outer peripheral area R2 following the flame propagation combustion from being started excessively early and to make the compression self-ignition combustion slow. Therefore, it is possible to suppress a rapid rise of in-cylinder pressure (pressure in the combustion chamber 6) accompanying the combustion and to reduce combustion noise. In particular, in the middle load operation region A2, the air-fuel ratio AF_R1 of the air-fuel mixture in the central area R1 is basically leaner than the stoichiometric air-fuel ratio (excluding a condition that the engine load is the fourth load Tq4). Therefore, in the middle load operation region A2, the flame propagation combustion in the central area R1 and the subsequent compression self-ignition combustion can be made slow more reliably, and an increase in the combustion noise can be suppressed more reliably.

In the high load operation region A3, the total amount of fuel to be supplied to the combustion chamber 6 increases due to the high engine load, and the amount of heat generation in the combustion chamber 6 increases. Therefore, in the high load operation region A3, the combustion noise tends to be higher than that in the middle load operation region A2. Therefore, if the same control as in the middle load operation region A2 is performed in the high load operation region A3, the combustion noise may not be sufficiently suppressed.

On the other hand, in the present embodiment, in the high load operation region A3, while the air-fuel ratio AF_R1 of the air-fuel mixture in the central area R1 is made leaner than the air-fuel ratio AF_R2 of the air-fuel mixture in the outer peripheral area R2, the air-fuel ratios AF_R1, AF_R2 of the air-fuel mixtures in these areas R1, R2 are made richer than the stoichiometric air-fuel ratio.

Therefore, it is possible to cool the air-fuel mixtures by latent heat of vaporization of a large amount of fuel and to suppress rapid increases in the combustion temperature and the in-cylinder pressure during combustion. In particular, since the air-fuel ratio AF_R2 of the air-fuel mixture in the outer peripheral area R2 is made richer than the air-fuel ratio AF_R1 of the air-fuel mixture in the central area R1 at the ignition timing, temperature of the air-fuel mixture in the outer peripheral area R2 can be suppressed low. Therefore, it is possible to effectively slow down the compression self-ignition combustion occurring in the outer peripheral area R2 and to reduce the combustion noise.

Figure 14:
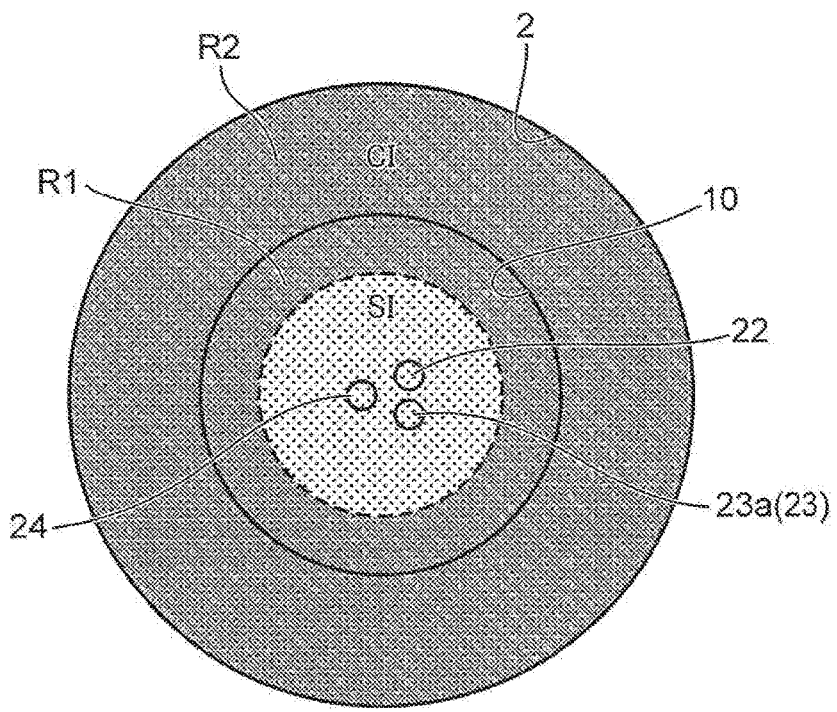
FIG. 14 is a view for explaining effects of the present invention, and is a schematic sectional view of the combustion chamber.
Figure 15:
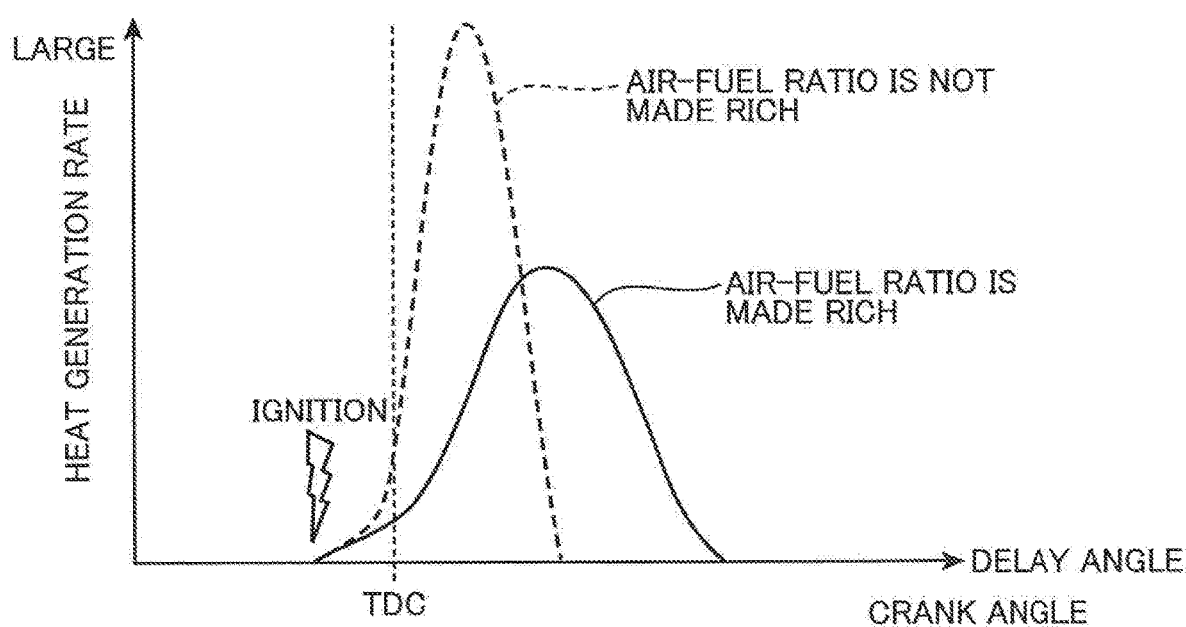
FIG. 15 is a diagram for explaining the effects of the present invention, and is a diagram showing a heat generation rate.

This will be concretely described with reference to FIGS. 14 and 15. FIG. 14 is a view corresponding to FIG. 3, and FIG. 15 is a diagram showing a heat generation rate.

If the air-fuel ratio in the combustion chamber 6 is not made richer than the stoichiometric air-fuel ratio in the high load operation region A3, a cooling effect due to the latent heat of vaporization of the fuel is small, so that rapid flame propagation combustion (SI combustion) around the ignition plug 23 occurs, and that surrounding temperature rapidly rises. Therefore, in this case, as shown in FIG. 14, the compression self-ignition combustion (CI combustion) also occurs in an outer peripheral portion of the central area R1, and the compression self-ignition combustion (CI combustion) starts excessively early. In addition, in this case, a large amount of air-fuel mixture consisting of an air-fuel mixture existing in the outer peripheral portion of the central area R1 and the air-fuel mixture existing in the outer peripheral area R2 performs the compression self-ignition combustion (CI combustion) in a short period. Accordingly, in this case, as indicated by a broken line in FIG. 15, immediately after the ignition, the air-fuel mixture in the entire combustion chamber 6 is burned rapidly, the in-cylinder pressure rapidly increases, and the combustion noise increases.

On the other hand, in the present embodiment, in the high load operation region A3, the air-fuel ratio AF_R1 of the air-fuel mixture in the central area R1 is richer than the stoichiometric air-fuel ratio. Therefore, temperature of the air-fuel mixture in the central area R1 can be kept low by the latent heat of vaporization of the large amount of fuel. Accordingly, it is possible to suppress occurrence of the rapid flame propagation combustion (SI combustion) around the ignition plug 23, to prevent premature ignition of the air-fuel mixtures (excessively early self-ignition combustion of the air-fuel mixtures) in the outer peripheral portion of the central area R1 and the outer peripheral area R2, and to slow the combustion of the air-fuel mixture in the outer peripheral area R2. Furthermore, in the present embodiment, since the air-fuel ratio AF_R2 of the air-fuel mixture in the outer peripheral area R2 is made richer than the stoichiometric air-fuel ratio, the temperature of the air-fuel mixture in the outer peripheral area R2 can also be kept low. In particular, the air-fuel ratio AF_R2 of the air-fuel mixture in the outer peripheral area R2 is made richer than the air-fuel ratio AF_R1 of the air-fuel mixture of the air-fuel mixture in the central area R1, thereby effectively suppressing the temperature of the air-fuel mixture in the outer peripheral area R2 low. Therefore, as shown by a solid line in FIG. 15, it is possible to slow the combustion of the air-fuel mixture, that is, the compression self-ignition combustion (CI combustion) of the air-fuel mixture in the outer peripheral area R2 and to effectively reduce the combustion noise.

Furthermore, in the present embodiment, water is injected into the combustion chamber 6 in the high load operation region A3. Therefore, it is possible to further suppress the rise of the combustion temperature by raising specific heat of the air-fuel mixture.

Particularly, in the present embodiment, in the high load operation region A3, the injection water is supplied to both the outer peripheral area R2 and the central area R1. Therefore, the injection water supplied to the central area R1 slows the flame propagation combustion in the central area R1 to suppress the temperature rise in the surroundings. As a result, it is possible to prevent the compression self-ignition combustion from starting excessively early and to slow down the compression self-ignition combustion. Also, the injection water supplied to the outer peripheral area R2 suppresses the temperature rise in the outer peripheral area R2 and can further slow down the compression self-ignition combustion. Accordingly, the combustion noise can be more reliably reduced in the high load operation region A3.

This also applies to the middle load third region A2_3. In other words, in the present embodiment, since the injection water is supplied to both the outer peripheral area R2 and the central area R1 also in the middle load third region A2_3, the combustion noise can be reliably reduced.

In the middle load second region A2_2, and in a region where the engine load is relatively low but not sufficiently low, the injection water is supplied only to the outer peripheral area R2. Therefore, while preventing excessive lowering of the temperature in the central area R1 and inappropriate propagation of flame caused by supply of the injection water to the area R1, the compression self-ignition combustion in the outer peripheral area R2 can be made slow. Therefore, the combustion noise can be reduced while achieving the compression self-ignition combustion.

(4) Modifications

In the above embodiment, a case where the injection water is supplied into the combustion chamber 6 in the middle load second region A2_2, the middle load third region A2_3, and the high load operation region A3 has been described, but control for supplying the injection water may be omitted. The water injection device 24 may be omitted. However, if the injection water is supplied into the combustion chamber 6 in these regions where the engine load is relatively high, it is possible to further reduce the combustion noise.

Further, in the above-described embodiment, a case where the water is injected such that the injection water exists in both the outer peripheral area R2 and the central area R1 at the ignition timing in the middle load third region A2_3 and the high load operation region A3 has been described, but water injection to the central area R1 may be omitted.

However, if the injection water is also present in the central area R1, the combustion noise can be further reduced.

In the above embodiment, when the injection water is supplied to both the central area R1 and the outer peripheral area R2 (when operating in the middle load third region A2_3 and the high load operation region A3), as the engine load increases, the difference between the concentration Cw_R1 of the injection water in the central area R1 and the concentration Cw_R2 of the injection water in the outer peripheral area R2 is decreased. However, the relationship between these concentrations is not limited to this, and a concentration difference may be made constant irrespective of the engine load. However, as described above, if this difference is made smaller as the engine load increases, and the concentration Cw_R2 of the injection water in the outer peripheral area R2 is increased, the combustion noise can be effectively reduced.

Further, in the above-described embodiment, a case where the injection water is distributed unevenly in the central area R1 and the outer peripheral area R2 by changing the injection timing of the water injection device 24 has been described. However, a specific configuration for unevenly distributing the injection water is not limited to this. For example, as the water injection device 24, a device capable of injecting water to different areas, for example, one capable of injecting water at different injection angles may be used. By changing this injection area (injection angle), water is unevenly distributed. Likewise, also in the injector 22, fuel may be unevenly distributed by changing an injection area or the like.

In the above embodiment, a case where the EGR valve 52 is opened to recirculate the EGR gas to the intake passage 30 in the whole operation region has been described, but the EGR gas may be recirculated only in a part of the operation region. Further, the EGR device 46 may be omitted. However, if the EGR gas is recirculated in the middle load operation region A2 and the high load operation region A3, inert gas in the combustion chamber 6 is increased, so that it is possible to more reliably suppress a rapid rise of the combustion temperature and an increase in the combustion noise accordingly.

Also, the geometric compression ratio of the engine body is not limited to the above. However, in order to realize appropriate flame propagation combustion while setting the air-fuel ratio of the air-fuel mixture in the central area R1 to be lean in the middle load operation region A2 or the like and to reliably realize the compression self-ignition combustion of the air-fuel mixture, it is preferable that the geometric compression ratio be set as in the above embodiment.

The above-described specific embodiment mainly includes an invention having the following configurations.

The present invention provides a premixed compression ignition engine that includes an engine body formed with a combustion chamber and self-ignites a mixture of fuel and air in the combustion chamber, the engine including: a fuel injection device that injects fuel into the combustion chamber; an ignition device having an electrode portion that faces an inside of the combustion chamber and ignites an air-fuel mixture in the combustion chamber to apply ignition energy to the air-fuel mixture; and a control device that controls the ignition device and the fuel injection device so as to occur, in at least a part of an operation region of the engine, SPCCI combustion in which an air-fuel mixture formed in a first area of the combustion chamber that includes the electrode portion of the ignition device is burned by receiving the ignition energy applied from the ignition device, and thereafter, an air-fuel mixture formed in a second area of the combustion chamber located on an outer periphery of the first area is self-ignited and burned by a pressure rise in the combustion chamber due to the combustion of the air-fuel mixture in the first area, wherein when the control device determines that the engine is operated in a high load operation region serving as an operation region in which an engine load is higher than a reference load set to a value equal to or more than half of a maximum load of the engine and in which the SPCCI combustion is executed, the fuel injection device is controlled so that an air-fuel ratio in the entire combustion chamber becomes richer than a stoichiometric air-fuel ratio and that an air-fuel ratio of the air-fuel mixture in the first area becomes leaner than an air-fuel ratio of the air-fuel mixture in the second area at an ignition timing of the ignition device.

In this configuration, the air-fuel mixture formed around the electrode portion of the ignition device is forcibly burned by ignition to cause flame propagation, and by increasing temperature in the combustion chamber by the flame propagation, the air-fuel mixture in the second area is self-ignited and burned. Therefore, the air-fuel mixture in the second area can be assuredly self-ignited and burned, whereby thermal efficiency can be enhanced. Also, by adjusting the ignition timing, it is possible to control a combustion start timing of the air-fuel mixture at an appropriate timing.

Moreover, in this configuration, the air-fuel ratio in the entire combustion chamber at the ignition timing is made richer than the stoichiometric air-fuel ratio in the high load operation region. Therefore, it is possible to cool the air-fuel mixture by latent heat of vaporization of a large amount of fuel supplied to the combustion chamber and to keep combustion temperature and in-cylinder pressure at the time of combustion low. In particular, since the air-fuel ratio of the air-fuel mixture in the second area is made richer (smaller) than the air-fuel ratio of the air-fuel mixture in the first area at the ignition timing, it is possible to keep temperature of the air-fuel mixture in the second area low. Therefore, it is possible to effectively slow down the compression self-ignition combustion occurring in the second area, to suppress a rapid rise of the in-cylinder pressure, and to suppress combustion noise to a small extent.

In the above configuration, it is preferable that, when the control device determines that the engine is operated in a state in which the engine load is the reference load, the fuel injection device is controlled so that the air-fuel ratio in the entire combustion chamber becomes the stoichiometric air-fuel ratio and that the air-fuel ratio of the air-fuel mixture in the first area and the air-fuel ratio of the air-fuel mixture in the second area both become the stoichiometric air-fuel ratio at the ignition timing.

According to this configuration, a relatively large amount of fuel is supplied to the combustion chamber even in a state in which the engine load is the reference load, so that a rapid rise in the in-cylinder pressure can be suppressed, and the combustion noise can be suppressed small.

In the above configuration, it is preferable that when the control device determines that the engine is operated in the high load operation region, in a case where the air-fuel ratio of the air-fuel mixture in the first area is set to a first air-fuel ratio at the ignition timing and the air-fuel ratio of the air-fuel mixture in the second area is set to a second air-fuel ratio at the ignition timing, the fuel injection device is controlled so that both the first air-fuel ratio and the second air-fuel ratio become richer than the stoichiometric air-fuel ratio, that both the first air-fuel ratio and the second air-fuel ratio decrease as the engine load increases, and that a decreasing rate of the second air-fuel ratio to an increase amount of the engine load is greater than a decreasing rate of the first air-fuel ratio to the increase amount of the engine load.

In this way, in the high load operation region, required engine torque is realized by the large amount of fuel supplied to the combustion chamber. Moreover, temperature rises in the first area and the second area, an increase in the in-cylinder pressure, and an increase in the combustion noise are appropriately suppressed by the large amount of fuel. Further, by setting the decreasing rate of the air-fuel ratio in the second area to be larger than the decreasing rate of the air-fuel ratio in the first area with respect to the increase amount of the engine load, the compression self-ignition combustion in the second area can be effectively slowed down. This effectively suppresses the increase in the combustion noise.

In the above configuration, it is preferable that when the control device determines that the engine is operated in the high load operation region, the fuel injection device is caused to perform a first fuel injection for injecting fuel in an intake stroke or in a first half of a compression stroke and a second fuel injection for injecting fuel after an end of the first fuel injection.

According to this configuration, it is possible to make the air-fuel ratios of the first area and the second area of the combustion chamber different from each other with a simple configuration in which the fuel is injected twice at different timings. In addition, the fuel is injected into the combustion chamber in a second half of the compression stroke or after a second half of the compression stroke, that is, at timing close to a compression top dead center, so that the temperature of the air-fuel mixture immediately before a start of the combustion can be effectively lowered by the latent heat of vaporization of the injected fuel.

In the above configuration, it is preferable that the engine body is provided with a piston that reciprocates in a cylinder defining the combustion chamber, the piston has a crown surface facing a ceiling portion of the combustion chamber, the ignition device is provided at a center of the ceiling portion of the combustion chamber, the fuel injection device is provided at the center of the ceiling portion of the combustion chamber and injects fuel toward the crown surface of the piston, and when the control device determines that the engine is operated in the high load operation region, the fuel injection device is caused to perform the first fuel injection so that an air-fuel mixture is formed in both the first area and the second area, and thereafter, the fuel injection device is caused to perform the second fuel injection so that the fuel is added to the air-fuel mixture formed in the second area.

This can make the air-fuel ratio in the second area richer than the air-fuel ratio in the first area with a simple configuration.

In the above-described configuration, it is preferable that a water injection device that injects water into the combustion chamber and supplies injection water to an air-fuel mixture is further provided, wherein when the control device determines that the engine is operated in the high load operation region, the water injection device is controlled so that the injection water exists in at least the second area at the ignition timing.

In this way, it is possible to further suppress the temperature rise of the air-fuel mixture in the second area in the high load operation region and to further reduce the combustion noise.

In the above configuration, it is preferable that a geometric compression ratio of the engine body is 16 or more and 35 or less.

In this way, the air-fuel mixture can be self-ignited by compression and burned more reliably.

The present invention also provides a method for controlling a premixed compression ignition engine, the engine including a fuel injection device that injects fuel into a combustion chamber and an ignition device provided with an electrode portion that faces an inside of the combustion chamber and ignites a mixture of fuel and air in the combustion chamber to apply ignition energy to the mixture, where SPCCI combustion in which an air-fuel mixture formed in a first area of the combustion chamber that includes the electrode portion of the ignition device is burned by receiving the ignition energy applied from the ignition device, and thereafter, an air-fuel mixture formed in a second area of the combustion chamber located on an outer periphery of the first area is self-ignited and burned by a pressure rise in the combustion chamber due to the combustion of the air-fuel mixture in the first area is performed in at least a part of an operation region of the engine, the method including: a step of determining whether or not the engine is operated in a high load operation region serving as an operation region in which an engine load is higher than a reference load set to a value equal to or more than half of a maximum load of the engine and in which the SPCCI combustion is performed; and a step of controlling the fuel injection device executed when the engine is operated in the high load operation region, so that an air-fuel ratio in the entire combustion chamber becomes richer than a stoichiometric air-fuel ratio and that an air-fuel ratio of the air-fuel mixture in the first area becomes leaner than an air-fuel ratio of the air-fuel mixture in the second area at an ignition timing of the ignition device.

According to this control method, the air-fuel mixture in the second area can be assuredly self-ignited and burned in the high load operation region, and thermal efficiency can be enhanced. Also, by adjusting the ignition timing, it is possible to control a combustion start timing of the air-fuel mixture at an appropriate timing. Furthermore, by controlling the air-fuel ratio in the first area and the air-fuel ratio in the second area as described above, it is possible to suppress combustion noise by suppressing combustion temperature and in-cylinder pressure during combustion to be low.

The above method preferably includes: a step of determining whether or not the engine is operated in a state in which the engine load is the reference load; and a step of controlling the fuel injection device executed when it is determined that the engine is operated in the state in which the engine load is the reference load, so that the air-fuel ratio in the entire combustion chamber becomes the stoichiometric air-fuel ratio and that the air-fuel ratio of the air-fuel mixture in the first area and the air-fuel ratio of the air-fuel mixture in the second area both become the stoichiometric air-fuel ratio at the ignition timing.

According to this method, even in the state in which the engine load is the reference load, it is possible to suppress a rapid rise of the in-cylinder pressure and to suppress the combustion noise at a small value.

In the above method, it is preferable that in the step executed when it is determined that the engine is operated in the high load operation region, in a case where the air-fuel ratio of the mixture in the first area is set to a first air-fuel ratio at the ignition timing and the air-fuel ratio of the air-fuel mixture in the second area is set to a second air-fuel ratio at the ignition timing, the fuel injection device is controlled so that both the first air-fuel ratio and the second air-fuel ratio become richer than the stoichiometric air-fuel ratio, that both the first air-fuel ratio and the second air-fuel ratio decrease as the engine load increases, and that a decreasing rate of the second air-fuel ratio to an increase amount of the engine load is greater than a decreasing rate of the first air-fuel ratio to the increase amount of the engine load.

According to this method, while required engine torque is reliably realized in the high load operation region, an increase in the combustion noise is appropriately suppressed.

The invention claimed is:

1. A premixed compression ignition engine that includes an engine body formed with a combustion chamber and self-ignites a mixture of fuel and air in the combustion chamber, the engine comprising:
a fuel injection device that injects fuel into the combustion chamber;
an ignition device having an electrode portion that faces an inside of the combustion chamber and ignites an air-fuel mixture in the combustion chamber to apply ignition energy to the air-fuel mixture; and
a control device that controls the ignition device and the fuel injection device so as to occur, in at least a part of an operation region of the engine, SPCCI combustion in which an air-fuel mixture formed in a first area of the combustion chamber that includes the electrode portion of the ignition device is burned by receiving the ignition energy applied from the ignition device, and thereafter, an air-fuel mixture formed in a second area of the combustion chamber located on an outer periphery of the first area is self-ignited and burned by a pressure rise in the combustion chamber due to the combustion of the air-fuel mixture in the first area,
wherein when the control device determines that the engine is operated in a high load operation region serving as an operation region in which an engine load is higher than a reference load set to a value equal to or more than half of a maximum load of the engine and in which the SPCCI combustion is executed, in a case where an air-fuel ratio of the air-fuel mixture in the first area is set to a first air-fuel ratio at an ignition timing of the ignition device and an air-fuel ratio of the air-fuel mixture in the second area is set to a second air-fuel ratio at the ignition timing, the fuel injection device is controlled so that both the first air-fuel ratio and the second air-fuel ratio become richer than a stoichiometric air-fuel ratio, that both the first air-fuel ratio and the second air-fuel ratio decrease as the engine load increases, that a decreasing rate of the second air-fuel ratio to an increase amount of the engine load is greater than a decreasing rate of the first air-fuel ratio to the increase amount of the engine load, that an air-fuel ratio in the entire combustion chamber becomes richer than the stoichiometric air-fuel ratio, and that an air-fuel ratio of the air-fuel mixture in the first area becomes leaner than an air-fuel ratio of the air-fuel mixture in the second area at the ignition timing, and
wherein when the control device determines that the engine is operated in a state in which the engine load is the reference load, the fuel injection device is controlled so that the air-fuel ratio in the entire combustion chamber becomes the stoichiometric air-fuel ratio and that the air-fuel ratio of the air-fuel mixture in the first area and the air-fuel ratio of the air-fuel mixture in the second area both become the stoichiometric air-fuel ratio at the ignition timing.

2. The premixed compression ignition engine according to claim 1, wherein
when the control device determines that the engine is operated in the high load operation region, the fuel injection device is caused to perform a first fuel injection for injecting fuel in an intake stroke or in a first half of a compression stroke and a second fuel injection for injecting fuel after an end of the first fuel injection.

3. The premixed compression ignition engine according to claim 2, wherein
the engine body is provided with a piston that reciprocates in a cylinder defining the combustion chamber, the piston has a crown surface facing a ceiling portion of the combustion chamber,
the ignition device is provided at a center of the ceiling portion of the combustion chamber,
the fuel injection device is provided at the center of the ceiling portion of the combustion chamber and injects fuel toward the crown surface of the piston, and
when the control device determines that the engine is operated in the high load operation region, the fuel injection device is caused to perform the first fuel injection so that an air-fuel mixture is formed in both the first area and the second area, and thereafter, the fuel injection device is caused to perform the second fuel injection so that the fuel is added to the air-fuel mixture formed in the second area.

4. The premixed compression ignition engine according to claim 1, further comprising:
a water injection device that injects water into the combustion chamber and supplies injection water to an air-fuel mixture,
wherein when the control device determines that the engine is operated in the high load operation region, the water injection device is controlled so that the injection water exists in at least the second area at the ignition timing.

5. The premixed compression ignition engine according to claim 1, wherein
a geometric compression ratio of the engine body is 16 or more and 35 or less.

6. A method for controlling a premixed compression ignition engine, the engine including a fuel injection device that injects fuel into a combustion chamber and an ignition device provided with an electrode portion that faces an inside of the combustion chamber and ignites a mixture of fuel and air in the combustion chamber to apply ignition energy to the mixture, where SPCCI combustion in which an air-fuel mixture formed in a first area of the combustion chamber that includes the electrode portion of the ignition device is burned by receiving the ignition energy applied from the ignition device, and thereafter, an air-fuel mixture formed in a second area of the combustion chamber located on an outer periphery of the first area is self-ignited and burned by a pressure rise in the combustion chamber due to the combustion of the air-fuel mixture in the first area is performed in at least a part of an operation region of the engine, the method comprising:
a step of determining whether or not the engine is operated in a high load operation region serving as an operation region in which an engine load is higher than a reference load set to a value equal to or more than half of a maximum load of the engine and in which the SPCCI combustion is performed; and a step of controlling the fuel injection device executed when the engine is operated in the high load operation region, so that an air-fuel ratio in the entire combustion chamber becomes richer than a stoichiometric air-fuel ratio and that an air-fuel ratio of the air-fuel mixture in the first area becomes leaner than an air-fuel ratio of the air-fuel mixture in the second area at an ignition timing of the ignition device, wherein in the step executed when it is determined that the engine is operated in the high load operation region, in a case where the air-fuel ratio of the mixture in the first area is set to a first air-fuel ratio at the ignition timing and the air-fuel ratio of the air-fuel mixture in the second area is set to a second air-fuel ratio at the ignition timing, the fuel injection device is controlled so that both the first air-fuel ratio and the second air-fuel ratio become richer than the stoichiometric air-fuel ratio, that both the first air-fuel ratio and the second air-fuel ratio decrease as the engine load increases, and that a decreasing rate of the second air-fuel ratio to an increase amount of the engine load is greater than a decreasing rate of the first air-fuel ratio to the increase amount of the engine load.

7. The method for controlling the premixed compression ignition engine according to claim 6, further comprising:

a step of determining whether or not the engine is operated in a state in which the engine load is the reference load; and a step of controlling the fuel injection device executed when it is determined that the engine is operated in the state in which the engine load is the reference load, so that the air-fuel ratio in the entire combustion chamber becomes the stoichiometric air-fuel ratio and that the air-fuel ratio of the air-fuel mixture in the first area and the air-fuel ratio of the air-fuel mixture in the second area both become the stoichiometric air-fuel ratio at the ignition timing.

\* \* \* \* \*